US009357126B2

(12) United States Patent
Ishii et al.

(10) Patent No.: US 9,357,126 B2
(45) Date of Patent: May 31, 2016

(54) IMAGING OPERATION TERMINAL, IMAGING SYSTEM, IMAGING OPERATION METHOD, AND PROGRAM DEVICE IN WHICH AN OPERATION MODE OF THE OPERATION TERMINAL IS SELECTED BASED ON ITS CONTACT STATE WITH AN IMAGING DEVICE

(71) Applicant: Olympus Corporation, Shibuya-ku, Tokyo (JP)

(72) Inventors: Kensuke Ishii, Tokyo (JP); Hitoshi Echigo, Sagamihara (JP); Joji Sakamoto, Joensuu (FI); Saori Matsumoto, Tokyo (JP); Yoshitaka Sato, Yokohama (JP)

(73) Assignee: Olympus Corporation, Tokyo (JP)

( * ) Notice: Subject to any disclaimer, the term of this patent is extended or adjusted under 35 U.S.C. 154(b) by 108 days.

(21) Appl. No.: 14/195,250

(22) Filed: Mar. 3, 2014

(65) Prior Publication Data

US 2014/0253742 A1    Sep. 11, 2014

(30) Foreign Application Priority Data

Mar. 6, 2013   (JP) .................................. 2013-044627

(51) Int. Cl.
*H04N 5/232*    (2006.01)
*H04N 5/225*    (2006.01)

(52) U.S. Cl.
CPC ........... *H04N 5/23245* (2013.01); *H04N 5/225* (2013.01); *H04N 5/23206* (2013.01);
(Continued)

(58) Field of Classification Search
CPC .............. H04N 5/232; H04N 5/23206; H04N 5/23245; H04N 5/23216; H04N 5/23258; H04N 5/225
See application file for complete search history.

(56) References Cited

U.S. PATENT DOCUMENTS

| 8,704,944 B1* | 4/2014 | Wierzoch ............. H04N 5/2251 348/207.99 |
| 2005/0212948 A1* | 9/2005 | Watanabe .......... H04N 5/23245 348/340 |

(Continued)

FOREIGN PATENT DOCUMENTS

| JP | 10-191128 | 7/1998 |
| JP | 2000-270249 | 9/2000 |

(Continued)

OTHER PUBLICATIONS

Office Action from corresponding Japanese Patent Application No. 2013-044627 (3 pgs.), mailed Jan. 27, 2015, with translation (3 pgs.).

*Primary Examiner* — Roberto Velez
*Assistant Examiner* — Abdelaaziz Tissire
(74) *Attorney, Agent, or Firm* — John C. Pokotylo; Straub & Pokotylo

(57) ABSTRACT

An imaging operation terminal may include: a storage section configured to store switching information of an operation mode which operates according to a state of physical contact with an imaging device; a communication section configured to perform wireless communication with the imaging device; a communication detection section configured to detect whether the wireless communication by the communication section with the imaging device is possible; a physical state detection section configured to detect the state of the physical contact with the imaging device; and an operation mode selection section configured to select one operation mode based on the switching information according to the state of the physical contact with the imaging device detected by the physical state detection section after the communication detection section has detected that the wireless communication with the imaging device is possible.

22 Claims, 22 Drawing Sheets

(52) U.S. Cl.
CPC ....... *H04N5/23216* (2013.01); *H04N 5/23248* (2013.01); *H04N 5/23258* (2013.01); *H04N 5/23287* (2013.01)

(56) References Cited

U.S. PATENT DOCUMENTS

| | | | | |
|---|---|---|---|---|
| 2005/0212954 A1* | 9/2005 | Senba | ................ | H04N 5/23209 348/360 |
| 2005/0219211 A1* | 10/2005 | Kotzin | ................ | G06F 1/1626 345/158 |
| 2006/0061663 A1* | 3/2006 | Park | ................ | H04N 5/23293 348/211.2 |
| 2006/0233545 A1* | 10/2006 | Senba | ................ | B03B 17/14 396/529 |
| 2007/0098385 A1* | 5/2007 | Tanaka | ................ | G03G 17/14 396/56 |
| 2007/0126883 A1* | 6/2007 | Ishige | ................ | H04N 5/23209 348/211.14 |
| 2007/0147815 A1* | 6/2007 | Tanaka | ................ | G03B 17/14 396/56 |
| 2007/0268371 A1* | 11/2007 | Misawa | ................ | H04N 5/2252 348/207.99 |
| 2007/0268382 A1* | 11/2007 | Shiomi | ................ | H04N 1/00283 348/231.7 |
| 2008/0031209 A1* | 2/2008 | Abhishek | ................ | H04W 8/005 370/338 |
| 2009/0079844 A1* | 3/2009 | Suzuki | ................ | 348/222.1 |
| 2009/0323108 A1* | 12/2009 | Shimma | ................ | H04N 1/00251 358/1.15 |
| 2011/0317680 A1* | 12/2011 | Goto | ................ | 370/338 |
| 2012/0086818 A1* | 4/2012 | Yamamoto | ................ | H04N 5/23293 348/207.1 |
| 2013/0111464 A1* | 5/2013 | Markas | ................ | G06F 8/41 717/174 |
| 2013/0141640 A1* | 6/2013 | Kim | ................ | H04N 5/2254 348/375 |
| 2014/0132781 A1* | 5/2014 | Adams | ................ | H04N 5/2254 348/207.1 |
| 2014/0313353 A1* | 10/2014 | Echigo | ................ | H04N 5/232 348/207.11 |
| 2014/0313356 A1* | 10/2014 | Sakamoto | ................ | H04N 5/23203 348/211.1 |
| 2015/0049202 A1* | 2/2015 | Okabe | ................ | G03B 17/02 348/207.1 |

FOREIGN PATENT DOCUMENTS

| | | |
|---|---|---|
| JP | 2005-286497 | 10/2005 |
| JP | 2005-323081 | 11/2005 |
| JP | 2006-319646 | 11/2006 |
| JP | 2007-214624 | 8/2007 |
| JP | 2007-274515 | 10/2007 |
| JP | 2010-109477 | 5/2010 |
| JP | 2010109477 A * | 5/2010 |

* cited by examiner

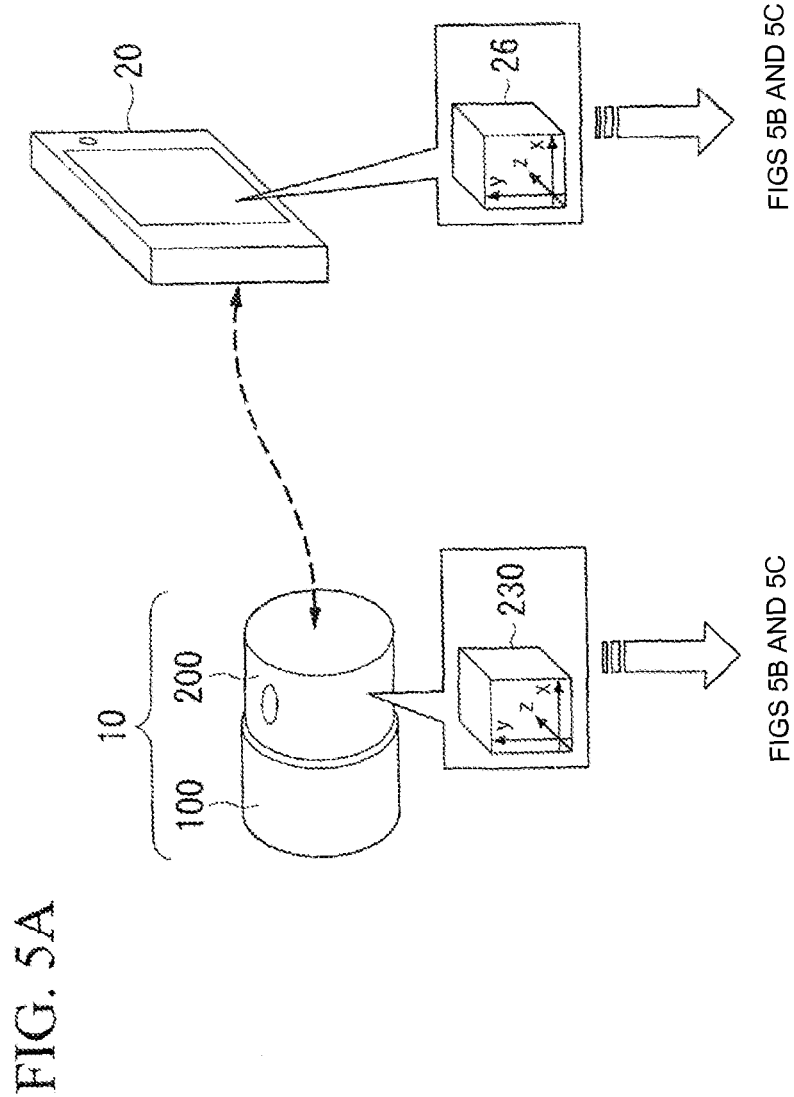

CONTACT STATE

NON-CONTACT STATE

OPERATION TABLE WHEN PHYSICAL CONTACT STATE HAS CHANGED

| VARIATION OF PHYSICAL CONTACT STATE | SHOOTING MODE | UTILIZATION MODE |
|---|---|---|
| COMBINED STATE → SEPARATED STATE | MODE C | MODE E |
| SEPARATED STATE → COMBINED STATE | MODE D | MODE F |

FIG. 16A  OPERATION TABLE WHEN PHYSICAL CONTACT STATE HAS CHANGED

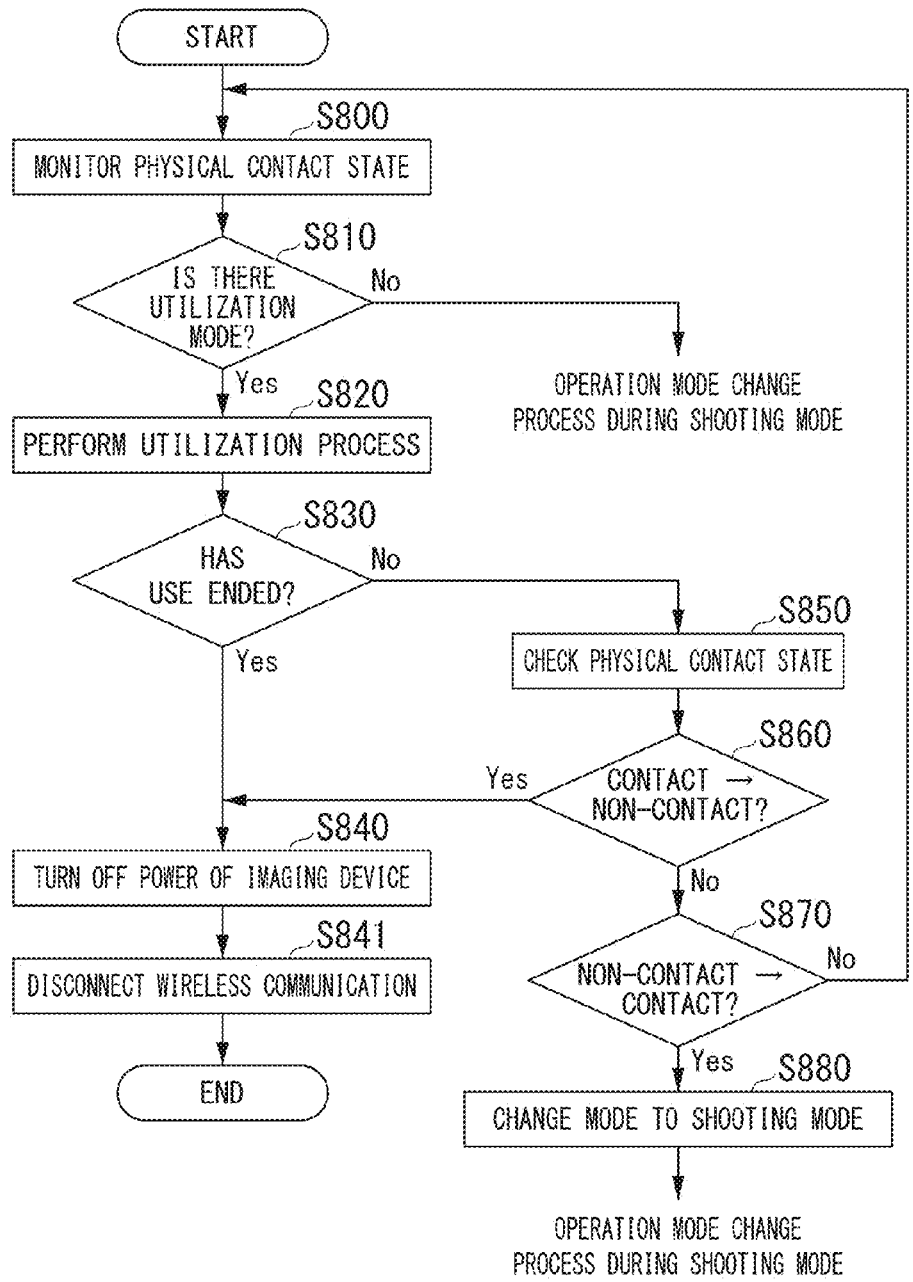

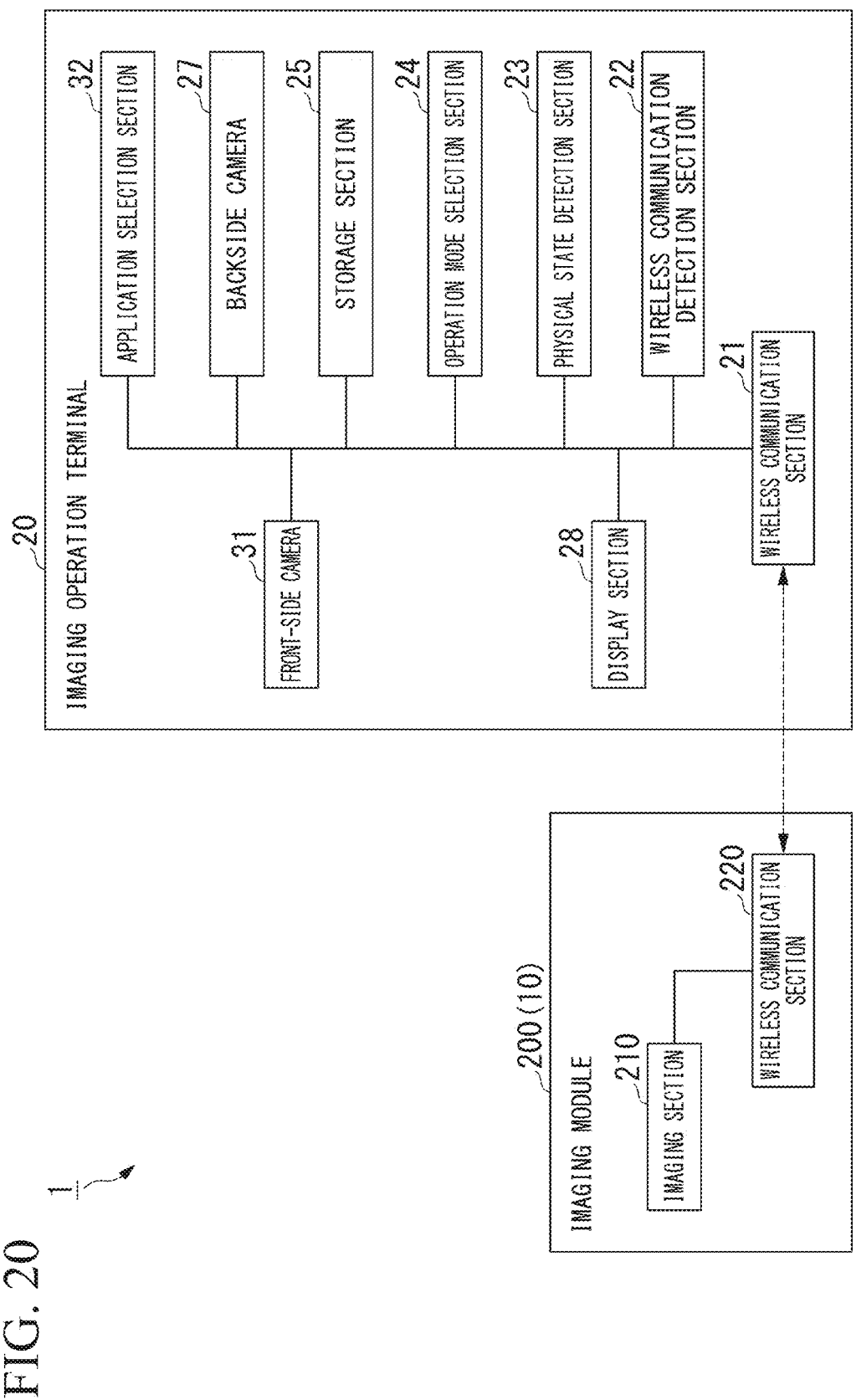

IMAGING OPERATION TERMINAL, IMAGING SYSTEM, IMAGING OPERATION METHOD, AND PROGRAM DEVICE IN WHICH AN OPERATION MODE OF THE OPERATION TERMINAL IS SELECTED BASED ON ITS CONTACT STATE WITH AN IMAGING DEVICE

BACKGROUND OF THE INVENTION

1. Field of the Invention

The present invention relates to an imaging operation terminal, an imaging system, an imaging operation method, and a program device.

Priority is claimed on Japanese Patent Application No. 2013-044627, filed Mar. 6, 2013, the content of which is incorporated herein by reference.

2. Description of the Related Art

In the related art, for example, a camera system including a camera head having an optical system such as a lens and an imaging element and a camera main body to which the camera head is detachably attached and which controls an operation of the camera head is known as disclosed in Japanese Unexamined Patent Application, First Publication No. 2006-319646 (hereinafter referred to as Patent Literature 1).

The camera system disclosed in Patent Literature 1 includes a plurality of processing modes such as a shooting mode to be set when shooting is performed and a playback mode to be set when an image obtained by the shooting is displayed on a display section and enable a photographer to change the mode to any processing mode when necessary. In addition, in Patent Literature 1, technology in which the camera main body is temporarily switched to a processing mode other than the shooting mode and is in a standby state when separation of the camera head from the camera main body is detected in a state in which the camera main body is set to the shooting mode and then the camera main body returns to the shooting mode when the attachment of the camera head to the camera main body is detected during the standby state is disclosed.

In the technology disclosed in Patent Literature 1, an electrical contact point is provided in each of a camera head side and a camera main body side of a mount section configured to fit the camera head to the camera main body, and the camera head and the camera main body perform communication via the electrical contact point. In addition, a contact point for detection is provided on the mount section, and the attachment/detachment of the camera head to/from the camera main body is detected according to the detection result for the contact point for the detection.

According to recent advances in communication technology, it is possible to wirelessly perform communication between the camera head and the camera main body. In addition, when the communication between the camera head and the camera main body can be wirelessly performed, it is possible to perform shooting in a state in which the camera head and the camera main body are not fitted, i.e., even when the camera head and the camera main body are at separate positions, and thus expansion of a use range of the camera system may be desired.

SUMMARY

According to a first aspect of the present invention, there is provided an imaging operation terminal including: a storage section configured to store switching information of an operation mode which operates according to a state of physical contact with an imaging device; a communication section configured to perform wireless communication with the imaging device; a communication detection section configured to detect whether the wireless communication by the communication section with the imaging device is possible; a physical state detection section configured to detect the state of the physical contact with the imaging device; and an operation mode selection section configured to select one operation mode based on the switching information according to the state of the physical contact with the imaging device detected by the physical state detection section after the communication detection section has detected that the wireless communication with the imaging device is possible.

According to a second aspect of the present invention, there is provided a shooting system including: an imaging device including an imaging element configured to photoelectrically convert an optical image of a subject incident via a lens and configured to transmit an image according to a pixel signal output from the imaging element through wireless communication; and an imaging operation terminal including a storage section configured to store switching information of an operation mode which operates according to a state of physical contact with the imaging device; a communication section configured to perform wireless communication with the imaging device; a communication detection section configured to detect whether the wireless communication by the communication section with the imaging device is possible; a physical state detection section configured to detect the state of the physical contact with the imaging device; and an operation mode selection section configured to select one operation mode based on the switching information according to the state of the physical contact with the imaging device detected by the physical state detection section after the communication detection section has detected that the wireless communication with the imaging device is possible and configured to receive the image transmitted from the imaging device and control shooting by the imaging device through wireless communication.

According to a third aspect of the present invention, there is provided an imaging operation method including: a communication step of performing wireless communication with an imaging device; a communication detection step of detecting whether the wireless communication with the imaging device is possible in the communication step; a physical state detection step of detecting a state of physical contact with the imaging device; and an operation mode selection step of selecting one operation mode based on switching information of an operation mode which operates according to the state of physical contact with the imaging device stored in a storage section according to the state of the physical contact with the imaging device detected in the physical state detection step after it has been detected that wireless communication with the imaging device is possible in the communication detection step.

According to a fourth aspect of the present invention, there is provided a program device storing a program for causing a computer to execute: a communication step of performing wireless communication with an imaging device; a communication detection step of detecting whether the wireless communication with the imaging device is possible in the communication step; a physical state detection step of detecting a state of physical contact with the imaging device; and an operation mode selection step of selecting one operation mode based on switching information of an operation mode which operates according to the state of physical contact with the imaging device stored in a storage section according to the state of the physical contact with the imaging device detected in the physical state detection step after it has been detected that wireless communication with the imaging device is possible in the communication detection step.

BRIEF DESCRIPTION OF THE DRAWINGS

FIGS. 5A to 5C are diagrams illustrating a first method of detecting a physical contact state between an imaging device and an imaging operation terminal in the imaging system of this embodiment.

FIGS. 16A and 16B are an operation table and a flowchart illustrating a processing procedure of a second method of changing the operation mode when the physical contact state between the imaging device and the imaging operation terminal has changed in the imaging system of this embodiment, respectively.

FIGS. 17A and 17B are an operation table and a flowchart illustrating a processing procedure of a third method of changing the operation mode when the physical contact state between the imaging device and the imaging operation terminal has changed in the imaging system of this embodiment, respectively.

FIG. 20 is a block diagram illustrating a schematic configuration in the example of the use form of the imaging system of this embodiment.

DETAILED DESCRIPTION OF THE PREFERRED EMBODIMENTS

Figure 1:
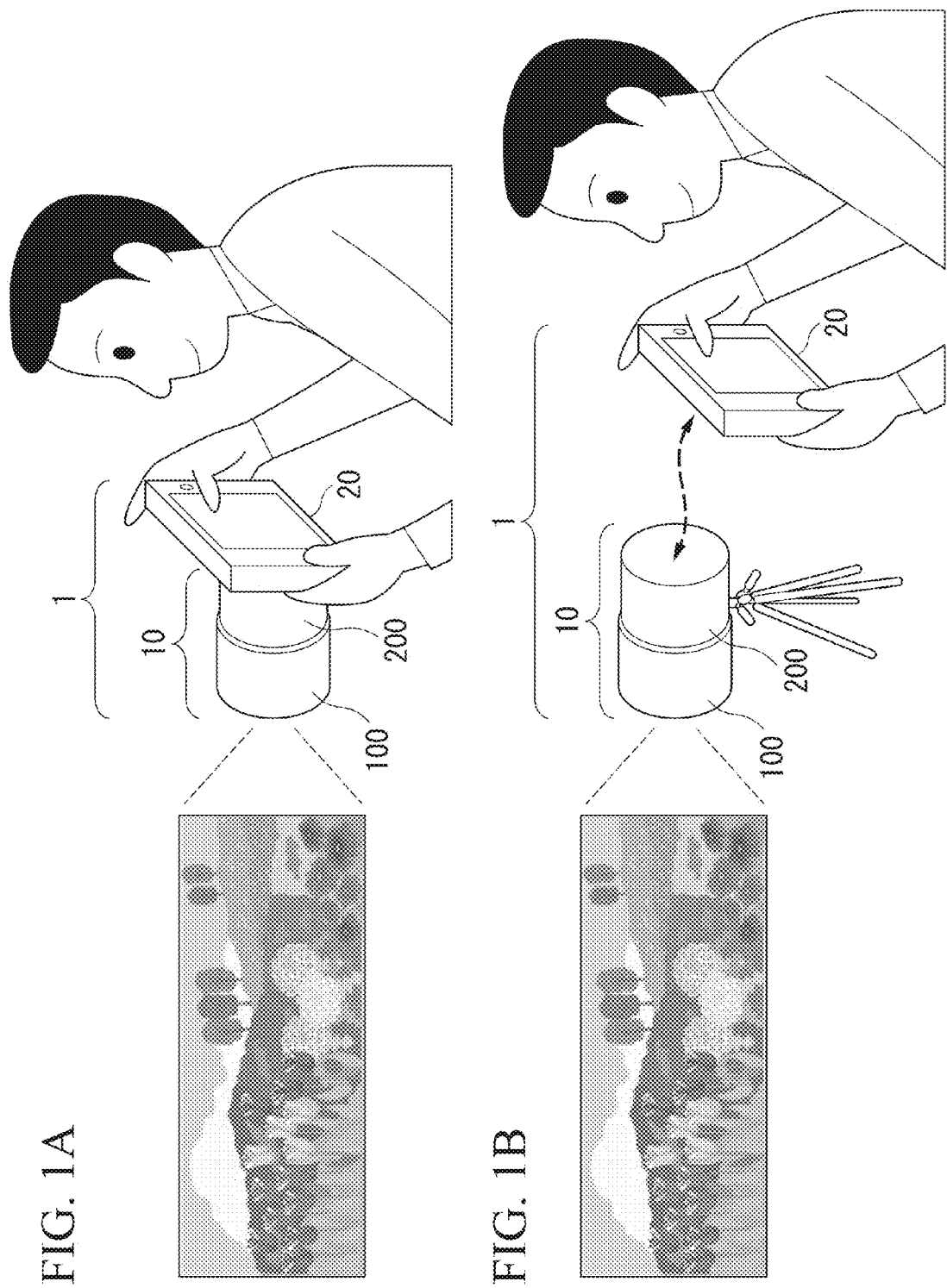
FIGS. 1A and 1B are diagrams each illustrating a use form of an imaging system in an embodiment of the present invention.

Hereinafter, an embodiment of the present invention will be described with reference to the drawings. FIGS. 1A and 1B are diagrams each illustrating a use form of an imaging system in an embodiment of the present invention. The imaging system 1 of this embodiment includes an imaging device 10 including an optical module 100 and an imaging module 200, and an imaging operation terminal 20.

The imaging system 1 includes a plurality of functions such as a function of performing shooting by the imaging device 10, a function of displaying and presenting an image obtained by the shooting on a display section provided in the imaging operation terminal 20, a function of processing the image obtained by the shooting using the imaging operation terminal 20, and a function of transmitting and sharing the image obtained by the shooting via a network such as the Internet. A user of the imaging system 1 can also use each function provided in the imaging system 1 by operating the imaging operation terminal 20 in a state in which the imaging device 10 and the imaging operation terminal 20 are combined as illustrated in FIG. 1A and a state in which the imaging device 10 and the imaging operation terminal 20 are separated as illustrated in FIG. 1B.

The optical module 100 is an optical unit including a lens and a lens control device configured to control zoom, focus, aperture, etc. to form a subject image, etc.

The imaging module 200 is an imaging element configured to form an image of subject light incident via the optical module 100 and photoelectrically convert an optical image of the subject and an imaging unit configured to transmit image data corresponding to a pixel signal output from the imaging element through wireless communication.

Although the imaging device 10 which is a configuration in which the optical module 100 and the imaging module 200 can be separated, i.e., in which the optical module 100 can be exchanged, is shown in the imaging system 1 of this embodiment, for example, the imaging device 10 in which the optical module 100 and the imaging module 200 are integrated may be provided. In addition, image data to be transmitted by the imaging device 10 (the imaging module 200) through wireless communication, for example, may be so-called RAW data obtained by converting a pixel signal output from the imaging element into a digital value or, for example, image data obtained by performing a compressing process based on an image format standard such as Joint Photographic Experts Group (JPEG).

The imaging operation terminal 20 is a terminal which is operated by the user and provides the user with various functions in the imaging system 1. In addition, the imaging operation terminal 20 performs the wireless communication with the imaging device 10 according to content operated by the user. For example, transmission of a control signal for controlling the imaging device 10, reception of information transmitted from the imaging device 10, reception of image data transmitted from the imaging device 10 (the imaging module 200), etc. are performed through the wireless communication.

Also, the imaging operation terminal 20 in the imaging system 1 of this embodiment may be a dedicated operation terminal which controls the imaging device 10. In addition, the imaging operation terminal 20, for example, may have a form in which application software configured to control the imaging device 10 is embedded in a portable communication terminal such as a so-called smartphone or tablet terminal in which a function of a portable telephone using an existing mobile communication network and a function of a portable information terminal (personal digital assistant (PDA)) are combined. In this case, a variety of other application software may be embedded in the portable communication terminal in addition to the application software configured to control the imaging device 10.

In this manner, the imaging device 10 and the imaging operation terminal 20 perform wireless communication in the imaging system 1 and therefore each function provided in the imaging system 1 is provided to the user in both states in which the imaging device 10 and the imaging operation terminal 20 are combined and separated as described above.

Also, for a configuration for the state in which the imaging device 10 and the imaging operation terminal 20 are combined, for example, a method of mechanically fitting the imaging module 200 and the imaging operation terminal 20, a method of causing the imaging module 200 and the imaging operation terminal 20 to be in contact using a magnet, etc., a method of attaching the imaging module 200 to a case or cover of the imaging operation terminal 20, or the like is considered. However, in this embodiment, the method or configuration for the state in which the imaging device 10 and the imaging operation terminal 20 are combined is not limited.

In the imaging system 1, it is possible to expand a use range of the imaging system 1 or improve usability by identifying a physical contact state of whether the imaging device 10 and the imaging operation terminal 20 are combined or separated. Thus, a configuration in which the physical contact state between the imaging device 10 and the imaging operation terminal 20 is detected is provided in the imaging system 1 of this embodiment. Hereinafter, details of the imaging system 1 of this embodiment will be described.

Figure 2:
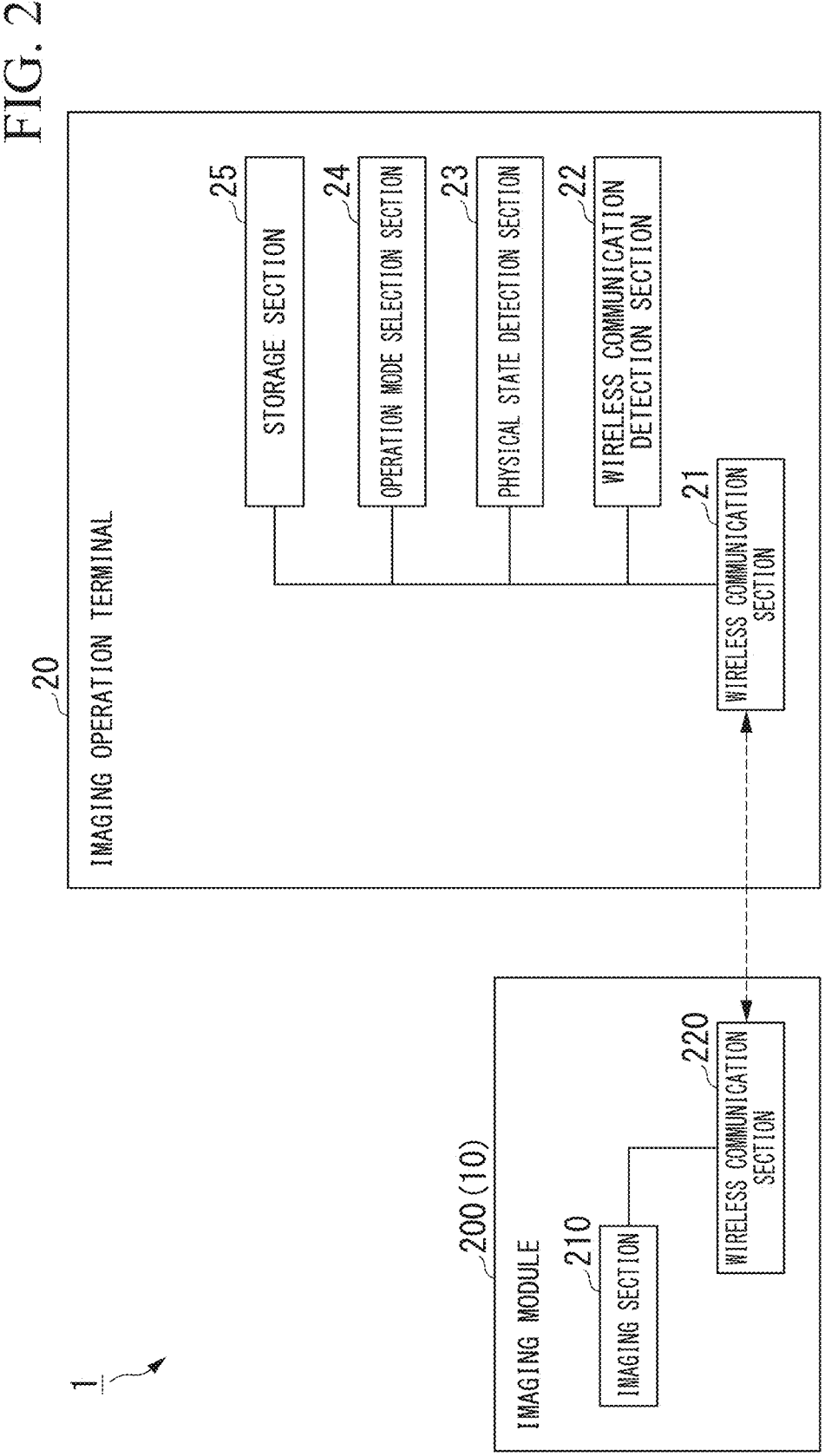
FIG. 2 is a block diagram illustrating a schematic configuration of the imaging system of this embodiment.

FIG. 2 is a block diagram illustrating a schematic configuration of the imaging system of this embodiment. The imaging system 1 illustrated in FIG. 2 includes the imaging device 10 and the imaging operation terminal 20. In FIG. 2, only the configuration of the imaging module 200 within the imaging device 10 including the optical module 100 and the imaging module 200 is illustrated.

The imaging module 200 includes the above-described imaging element and is provided with an imaging section 210 configured to generate image data according to a pixel signal output from the imaging element and a wireless communication section 220 configured to transmit the image data generated by the imaging section 210 through the wireless communication.

The imaging operation terminal 20 includes a wireless communication section 21, a wireless communication detection section 22, a physical state detection section 23, an operation mode selection section 24, and a storage section 25. The imaging operation terminal 20 receives the image data transmitted from the imaging device 10 (the imaging module 200) to present or provide the received image data to the user and detects the physical contact state between the imaging device 10 and the imaging operation terminal 20 to provide various functions according to a detection result to the user.

The wireless communication section 21 is a communication section configured to perform transmission and reception of control information or image data to and from the wireless communication section 220 provided in the imaging module 200 through the wireless communication.

The wireless communication detection section 22 detects the wireless communication in the wireless communication section 21 and determines whether wireless communication currently being performed by the wireless communication section 21 is connected to a communication partner. The determination of the communication partner by the wireless communication detection section 22, for example, is performed using information acquired via the wireless communication section 21 such as a service set identifier (SSID), a password, or an Internet protocol (IP) address preset for the communication partner. Then, when the wireless communication currently being performed by the wireless communication section 21 is determined to be directed to the communication partner, the wireless communication detection section 22 establishes the wireless communication by the wireless communication section 21.

Here, it is assumed that the wireless communication detection section 22 determines that the imaging module 200 is a partner to perform the wireless communication and performs the wireless communication with the imaging module 200 via the wireless communication section 21. Then, the wireless communication detection section 22 performs wireless communication of control information or image data to be transmitted and received between the imaging module 200 and the imaging operation terminal 20 via the wireless communication section 21.

The physical state detection section 23 detects the physical contact state between the imaging device 10 and the imaging operation terminal 20. Then, the physical state detection section 23 outputs information about the detected physical contact state between the imaging device 10 and the imaging operation terminal 20 to the operation mode selection section 24. Details related to a method of detecting the physical contact state between the imaging device 10 and the imaging operation terminal 20 in the physical state detection section 23 will be described later.

The storage section 25 stores settings corresponding to various functions (hereinafter referred to as "operation modes") provided in the imaging system 1. In addition, information about an operation mode to initially operate according to the physical contact state between the imaging device 10 and the imaging operation terminal 20 when the imaging system 1 starts up, an operation mode to be changed according to variation of the physical contact state between the imaging device 10 and the imaging operation terminal 20 after the imaging system 1 has started up, etc. is stored in the storage section 25.

According to the physical contact state between the imaging device 10 and the imaging operation terminal 20 detected by the physical state detection section 23, the operation mode selection section 24 refers to settings of the operation modes stored in the storage section 25 and selects the operation mode to be executed by the imaging operation terminal 20. That is, the operation mode selection section 24 selects a function to be provided by the imaging operation terminal 20 to the user. Also, details about a method of selecting the operation mode in the operation mode selection section 24 will be described later.

Figures 3, 4:
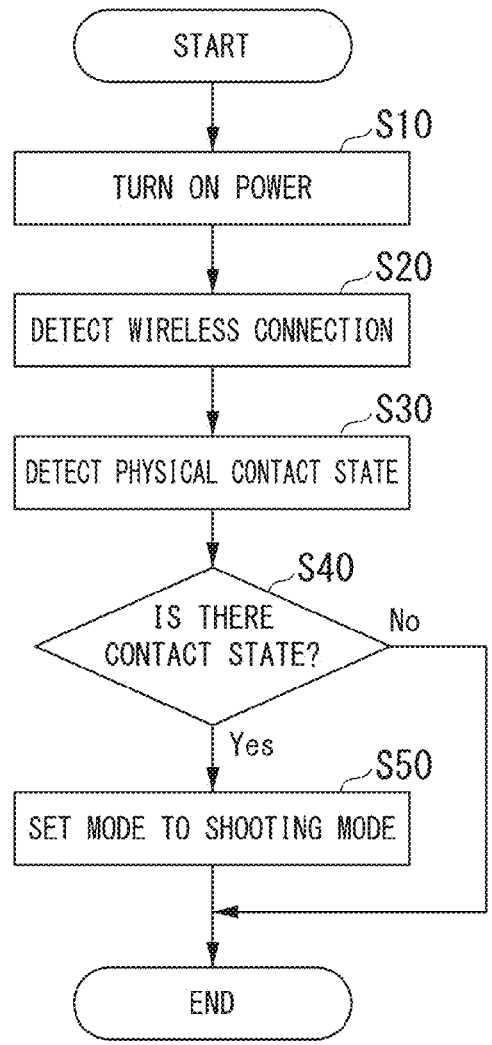
FIG. 3 is a diagram illustrating an operation mode when the imaging system of this embodiment starts up.
FIG. 4 is a flowchart illustrating a first processing procedure of starting up the imaging system of this embodiment.

Next, an operation when the imaging system 1 starts up will be described. In the start-up of the imaging system 1, the operation mode selection section 24 refers to the setting of operation modes stored in the storage section 25 and selects the operation mode (hereinafter referred to as a "start-up mode") to be initially executed by the imaging operation terminal 20 according to the physical contact state between the imaging device 10 and the imaging operation terminal 20. First, the operation mode when the imaging system 1 starts up stored in the storage section 25 will be described. FIG. 3 is a diagram illustrating the operation mode when the imaging system 1 of this embodiment starts up.

As described above, the imaging system 1 includes a plurality of operation modes such as a function (hereinafter referred to as a "shooting mode") of performing shooting by the imaging device 10, a function (hereinafter referred to as a "playback mode") of displaying and presenting an image obtained by the shooting on a display section provided in the imaging operation terminal 20, a function (hereinafter referred to as a "processing mode") of processing the image obtained by the shooting using the imaging operation terminal 20, and a function (hereinafter referred to as an "image transmission mode") of transmitting and sharing the image obtained by the shooting via a network such as the Internet.

Thus, a start-up mode table in which the operation mode to start up according to the physical contact state between the imaging device 10 and the imaging operation terminal 20 is set is provided in the storage section 25. The user can freely preset the start-up mode to be initially used when the imaging system 1 starts up in the start-up mode table. For example, the user can set the shooting mode in which the combined imaging device 10 performs shooting as the start-up mode (mode A illustrated in FIG. 3) when the imaging system 1 has started up in a state (combined state) in which the imaging device 10 and the imaging operation terminal 20 have been combined. In addition, the user can set the playback mode, the processing mode, or the image transmission mode in which the image obtained by the shooting is utilized (hereinafter, the operation mode in which the image obtained by the shooting is utilized is referred to as a "utilization mode") as the start-up mode (mode B illustrated in FIG. 3) when the imaging system 1 has started up in a state (separated state) in which the imaging device 10 and the imaging operation terminal 20 are separated.

Thereby, the operation mode selection section 24 can promptly select the start-up mode to be initially used by the user when the imaging system 1 starts up by referring to the start-up mode table stored in the storage section 25. Thereby, the user does not select the operation mode to be used every time the imaging system 1 starts up, and the imaging operation terminal 20 can automatically start up software according to the selected start-up mode. For example, when the imaging operation terminal 20 is a portable communication terminal such as a smartphone, it is possible to automatically start up application software according to the selected start-up mode.

(First Start-Up Process)

Next, a processing procedure when the imaging system 1 starts up will be described. FIG. 4 is a flowchart illustrating a first processing procedure of starting up the imaging system 1 of this embodiment. Also, in the following description, the shooting mode will be described as being set as the start-up mode (mode A illustrated in FIG. 3) of the combined state of the imaging device 10 and the imaging operation terminal 20 in the start-up mode table of the storage section 25.

When the user turns ON power of the imaging device 10 and the imaging operation terminal 20 in step S10, a start-up process of the imaging system 1 starts. When the start-up process of the imaging system 1 starts, the wireless communication detection section 22 detects a connection of wireless communication between the wireless communication section 21 and the imaging device 10 in step S20. Then, when the wireless communication currently being performed by the wireless communication section 21 is connected with the wireless communication section 220 provided in the imaging device 10, the wireless communication is established.

Subsequently, in step S30, the physical state detection section 23 detects the physical contact state between the imaging device 10 and the imaging operation terminal 20. Subsequently, in step S40, the operation mode selection section 24 checks a result of the physical contact state between the imaging device 10 and the imaging operation terminal 20 detected by the physical state detection section 23. Then, when the result of the check of step S40 indicates that the result of the physical contact state between the imaging device 10 and the imaging operation terminal 20 detected by the physical state detection section 23 is the contact state, i.e., the combined state ("Yes" in step S40), the process proceeds to step S50.

Then, the operation mode selection section 24 sets the operation mode in which the imaging system 1 starts up to the shooting mode by referring to the start-up mode table stored in the storage section 25 in step S50, and ends the start-up process of the imaging system 1. Accordingly, the imaging operation terminal 20 can start up software according to the set shooting mode. For example, when the imaging operation terminal 20 is a portable communication terminal such as a smartphone, it is possible to start up application software corresponding to the shooting mode.

Also, an example in which the start-up process of the imaging system 1 ends when the result of the check of step S40 indicates that the result of the physical contact state between the imaging device 10 and the imaging operation terminal 20 detected by the physical state detection section 23 is not the contact state ("No" in step S40) is illustrated in the flowchart representing the first processing procedure illustrated in FIG. 4. That is, the case in which the operation mode selection section 24 does not set any operation mode as the operation mode in which the imaging system 1 starts up is shown. However, when the result of the physical contact state detected by the physical state detection section 23 is not the contact state, for example, the imaging device 10 and the imaging operation terminal 20 are considered to be in the separated state. In this case, when the utilization mode is set as the start-up mode when the imaging system 1 has started up in the separated state in the start-up mode table stored in the storage section 25, the operation mode selection section 24 can set the operation mode in which the imaging system 1 starts up as the utilization mode by referring to the start-up mode table stored in the storage section 25. Accordingly, the imaging operation terminal 20 can start up software according to the set utilization mode. For example, when the imaging operation terminal 20 is the portable communication terminal such as the smartphone, it is possible to start up the application software according to the utilization mode. Also, the operation mode selection section 24 can set the mode to the operation mode set when the power of the imaging device 10 and the imaging operation terminal 20 was previously turned OFF.

(First Physical Contact State Detection Method)

Figure 5B:
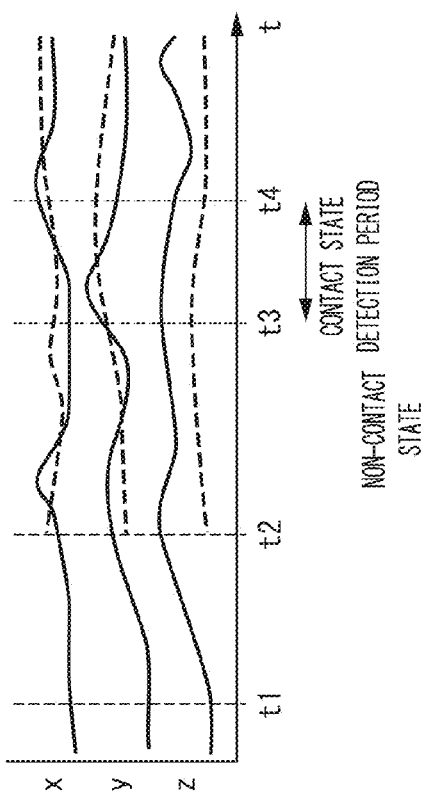
Figure 5C:
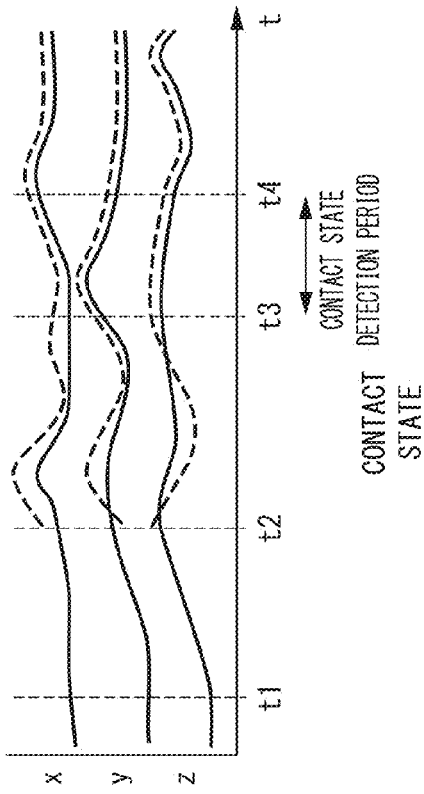

Next, a method of detecting the physical contact state between the imaging device 10 and the imaging operation terminal 20 in the physical state detection section 23 will be described. FIGS. 5A to 5C are diagrams illustrating a first method (first physical contact state detection method) of detecting the physical contact state between the imaging device 10 and the imaging operation terminal 20 in the imaging system 1 of this embodiment. This first physical contact state detection method is a method of detecting the physical contact state between the imaging device 10 and the imaging operation terminal 20 using a motion sensor 230 provided in the imaging device 10 and a motion sensor 26 provided in the imaging operation terminal 20 as illustrated in FIG. 5A.

The physical state detection section 23 detects the physical contact state between the imaging device 10 and the imaging operation terminal 20 by comparing information about a motion amount of each direction of the imaging device 10 detected by the motion sensor 230 to information about a motion amount of each direction of the imaging operation terminal 20 detected by the motion sensor 26. Also, the directions in the imaging device 10 and the imaging operation terminal 20, for example, are a horizontal direction, a vertical direction, and an elevation/depression angle direction.

Also, for example, it is possible to use an acceleration sensor, a gyro sensor, or the like as the motion sensor 230 configured to detect a motion amount when a blur or the like is corrected provided in the optical module 100 or the imaging module 200. In addition, for example, when the imaging operation terminal 20 is the portable communication terminal such as the smartphone, the acceleration sensor, the gyro sensor, or the like provided in the portable communication terminal can be used as the motion sensor 26.

In the imaging system 1, the power of the imaging device 10 and the imaging operation terminal 20 is turned ON and the physical state detection section 23 starts the detection of the physical contact state according to the first physical contact state detection method after a predetermined time has elapsed after wireless communication between the imaging device 10 and the imaging operation terminal 20 has been established. Here, the timing of the first physical contact state detection method in the imaging system 1 will be described using timing charts illustrated in FIGS. 5B and 5C. FIG. 5B illustrates an example of motion of each direction of the imaging device 10 and the imaging operation terminal 20 when the imaging device 10 and the imaging operation terminal 20 are in the combined state and FIG. 5C illustrates an example of motion of each direction of the imaging device 10 and the imaging operation terminal 20 when the imaging device 10 and the imaging operation terminal 20 are in the separated state.

When the power of the imaging device 10 and the imaging operation terminal 20 is turned ON, the motion sensor 26 detects motion amounts of the directions (x, y, and z directions) of the imaging operation terminal 20 itself from a time t1 and outputs the detected information (hereinafter referred to as "motion amount information"). Here, information about the motion amounts of the directions output from the motion sensor 26 is input to the physical state detection section 23. In addition, the motion sensor 230 detects the motion amounts of the directions (x, y, and z directions) of the imaging device 10 itself and transmits the detected motion amount information from the wireless communication section 220.

Thereafter, when the wireless communication between the imaging device 10 and the imaging operation terminal 20 is established at a time t2, the wireless communication section 21 receives the motion amount information of the directions of the imaging device 10 transmitted from the wireless communication section 220 of the imaging device 10 and outputs the received motion amount information to the physical state detection section 23. Thereafter, it waits for a predetermined time until a time t3 is reached. This is to wait for value of the motion amount of each direction of the imaging device 10 detected by the motion sensor 230 to be stable.

Then, from the time t3, the physical state detection section 23 starts to compare the motion amount information of each direction of the imaging operation terminal 20 input from the motion sensor 26 to the motion amount information of each direction of the imaging device 10 input from the wireless communication section 21. That is, the first physical contact state detection process starts. In the first physical contact state detection process, the comparison between each piece of the motion amount information of the directions of the imaging operation terminal 20 input from the motion sensor 26 for every unit time and each piece of the motion amount information of the directions of the imaging device 10 input from the wireless communication section 21 for every unit time is performed during a predetermined period (hereinafter referred to as a "contact state detection period"). In FIGS. 5A to 5C, an example in which the first physical contact state detection process is performed until a time t4 is reached is illustrated.

Then, when the result of the physical contact state between the imaging device 10 and the imaging operation terminal 20 is obtained at the time t4, the operation mode selection section 24 sets the mode to the operation mode according to the result of the physical contact state obtained by the physical state detection section 23. For example, the mode is set to the shooting mode in the example illustrated in FIG. 5B and the mode is set to the utilization mode in the example illustrated in FIG. 5C.

Figure 6:
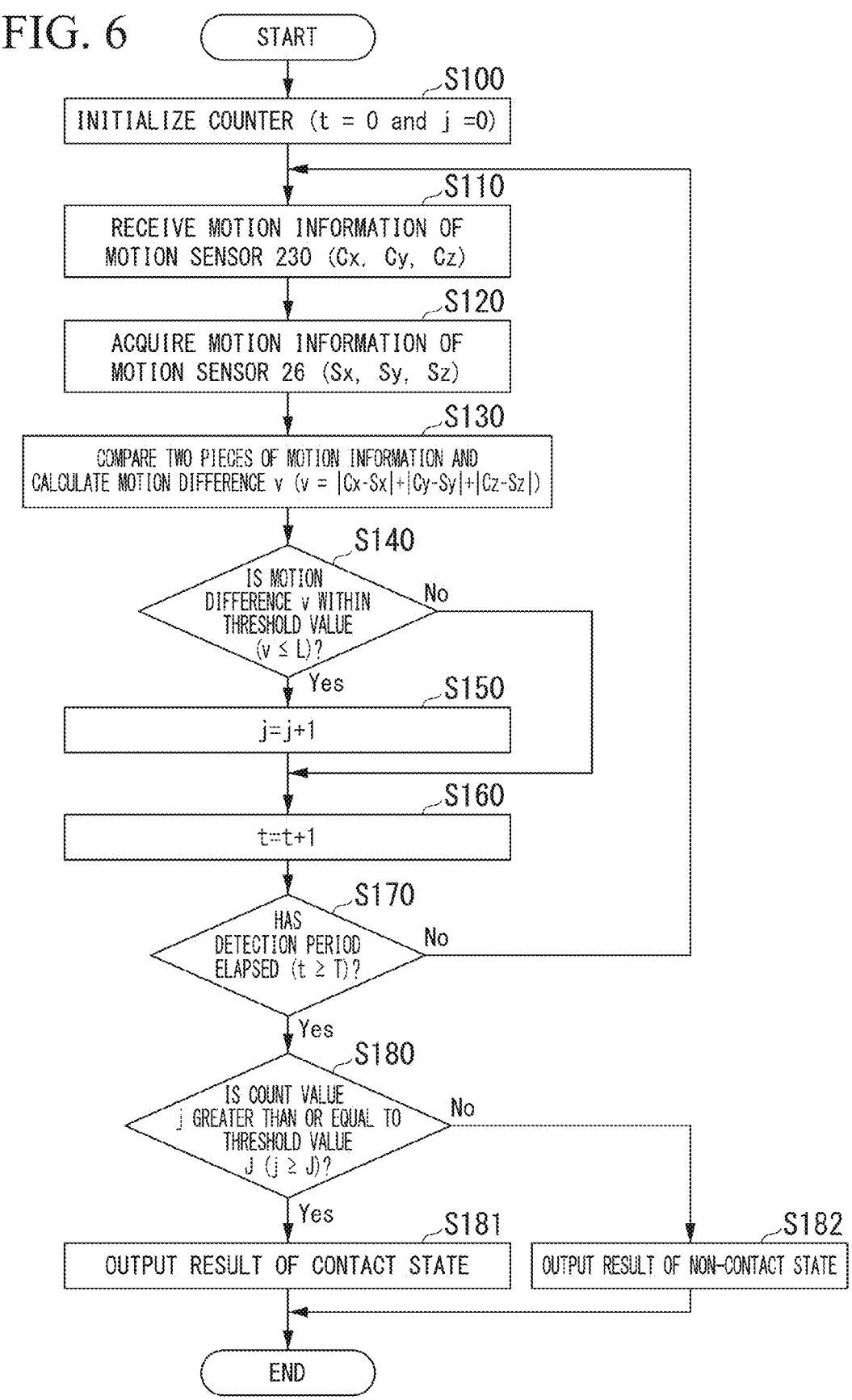
FIG. 6 is a flowchart illustrating a processing procedure of the first method of detecting the physical contact state between the imaging device and the imaging operation terminal in the imaging system of this embodiment.

Here, the first physical contact state detection process by the physical state detection section 23 will be described. FIG. 6 is a flowchart illustrating a processing procedure of the first method (first physical contact state detection process) of detecting the physical contact state between the imaging device 10 and the imaging operation terminal 20 in the imaging system 1 of this embodiment. From the time t3 illustrated in FIGS. 5B and 5C, i.e., after a predetermined time has elapsed from the establishment of wireless communication between the imaging device 10 and the imaging operation terminal 20, the physical state detection section 23 starts the first physical contact state detection process.

When the first physical contact state detection process starts, the physical state detection section 23 first initializes values of a counter t configured to count a time within the contact state detection period and a counter j configured to count the number of times that a difference between instantaneous motion amounts of the imaging device 10 and the imaging operation terminal 20 obtained from the motion amount information detected by the motion sensor 230 and the motion amount information detected by the motion sensor 26 is within a threshold value L of a predetermined instantaneous motion amount difference to "0" in step S100.

Subsequently, in step S110, the physical state detection section 23 acquires the motion amount information of the imaging device 10 received by the wireless communication section 21, i.e., motion amount information Cx of a direction x, motion amount information Cy of a direction y, and motion amount information Cz of a direction z of the imaging device 10 itself detected by the motion sensor 230.

Subsequently, in step S120, the physical state detection section 23 acquires motion amount information Sx of the direction x, motion amount information Sy of the direction y, and motion amount information Sz of the direction z of the imaging operation terminal 20 itself detected by the motion sensor 26.

Subsequently, in step S130, the physical state detection section 23 compares the motion amount information of each direction of the imaging device 10 detected by the motion sensor 230 to the motion amount information of each direction of the imaging operation terminal 20 detected by the motion sensor 26, and calculates a difference v between instantaneous motion amounts of the imaging device 10 and the imaging operation terminal 20, for example, according to the following Equation (1).

$$v=|Cx-Sx|+|Cy-Sy|+|Cz-Sz| \quad (1)$$

Also, it is desirable to match (calibrate) a characteristic when the motion sensor 230 detects the motion amount of each direction of the imaging device 10 and a characteristic when the motion sensor 26 detects the motion amount of each direction of the imaging operation terminal 20 in advance.

Subsequently, in step S140, the physical state detection section 23 determines whether the calculated instantaneous motion amount difference v is within the threshold value L of the predetermined instantaneous motion amount difference. Then, when the determination result of step S140 indicates that the instantaneous motion amount difference v is not within the threshold value L of the predetermined instantaneous motion amount difference, i.e., when v>L ("No" in step S140), the physical state detection section 23 proceeds to step S160. In addition, when the determination result of step S140 indicates that the instantaneous motion amount difference v is within the threshold value L of the predetermined instantaneous motion amount difference, i.e., when v≤L ("Yes" in step S140), the physical state detection section 23 counts up the counter j by adding "1" to the value of the counter j in step S150.

Subsequently, in step S160, the physical state detection section 23 counts up the counter t by adding "1" to the value of the counter t. That is, a time within the contact state detection period is advanced. Subsequently, in step S170, the physical state detection section 23 determines whether the contact state detection period has elapsed. Then, when the result of the determination of step S170 indicates that the contact state detection period has not elapsed ("No" in step S170), the physical state detection section 23 returns to step S110 and iterates the determination of the difference between the instantaneous motion amounts of the imaging device 10 and the imaging operation terminal 20, i.e., steps S110 to S170, until the contact state detection period has elapsed.

In addition, when the result of the determination of step S170 indicates that the contact state detection period has elapsed ("Yes" in step S170), the physical state detection section 23 proceeds to step S180 and determines whether the imaging device 10 and the imaging operation terminal 20 are in the contact state. In step S180, it is determined whether the imaging device 10 and the imaging operation terminal 20 are in the contact state according to whether the count value of the counter j counting the number of times that the difference v between the instantaneous motion amounts of the imaging device 10 and the imaging operation terminal 20 is within the threshold value L of the predetermined instantaneous motion amount difference is greater than or equal to a predetermined threshold value J at which the imaging device 10 and the imaging operation terminal 20 can be determined to be in the contact state, i.e., according to whether the difference between the motion amounts of the imaging device 10 and the imaging operation terminal 20 is small.

Then, when the result of the determination of step S180 indicates that the count value of the counter j is greater than or equal to the threshold value J, i.e., when j≥J ("Yes" in step S180), a result representing that the imaging device 10 and the imaging operation terminal 20 are in a physical contact state (for example, the combined state) is output as the result of the first physical contact state detection process in step S181 and the first physical contact state detection process ends. In addition, when the result of the determination of step S180 indicates that the count value of the counter j is less than the threshold value J, i.e., when j<J ("No" in step S180), a result representing that the imaging device 10 and the imaging operation terminal 20 are physically in a non-contact state (for example, the separated state) is output as the result of the first physical contact state detection process in step S182 and the first physical contact state detection process ends.

Thereby, in the first physical contact state detection process, the physical contact state between the imaging device 10 and the imaging operation terminal 20 is detected using the motion sensor 230 provided in the imaging device 10 and the motion sensor 26 provided in the imaging operation terminal 20. Then, in the first physical contact state detection process, it is possible to more accurately detect the physical contact state between the imaging device 10 and the imaging operation terminal 20 by comparing motion amount information detected by the motion sensors 230 and 26 during a predetermined contact state detection period. In addition, in the first physical contact state detection process, it is possible to implement a configuration for detecting the physical contact state at a low cost because the motion sensors prepared in the optical module 100 or the imaging module 200 and the imaging operation terminal 20 are available.

Also, the first physical contact state detection process is not limited to a method using the counter j counting the number of times that the difference v between the instantaneous motion amounts of the imaging device 10 and the imaging operation terminal 20 is within the threshold value L of the predetermined instantaneous motion amount difference. For example, it is possible to accumulate the difference v between the instantaneous motion amounts of the imaging device 10 and the imaging operation terminal 20 and determine the physical contact state between the imaging device 10 and the imaging operation terminal 20 according to whether an accumulation result is within a predetermined threshold value at which the imaging device 10 and the imaging operation terminal 20 can be determined to be in the contact state, i.e., according to a magnitude of a difference between the motion amounts of the imaging device 10 and the imaging operation terminal 20.

Even after the first physical contact state detection process has ended, it is desirable that the motion amount information of the imaging device 10 detected by the motion sensor 230 and the motion amount information of the imaging operation terminal 20 detected by the motion sensor 26 be acquired, for example, sequentially or at cyclical intervals, and the physical state detection section 23 perform the first physical contact state detection process. Thereby, for example, in a state in which the user uses the imaging system 1, it is also possible to detect variation of the physical contact state between the imaging device 10 and the imaging operation terminal 20, and the operation mode selection section 24 can change a current operation mode to the operation mode according to the variation of the physical contact state.

(Second Physical Contact State Detection Method)

Next, another method of detecting the physical contact state between the imaging device 10 and the imaging operation terminal 20 in the physical state detection section 23 will be described. FIGS. 7A to 7D are diagrams illustrating the second method (second physical contact state detection method) of detecting the physical contact state between the imaging device 10 and the imaging operation terminal 20 in the imaging system 1 of this embodiment. This second physical contact state detection method is a method of detecting the physical contact state between the imaging device 10 and the imaging operation terminal 20 based on an image captured by a camera (hereinafter referred to as a "backside camera") 27 provided on a side with which the imaging device 10 is in physical contact in the imaging operation terminal 20 as illustrated in FIGS. 7A to 7D.

Figure 7A:
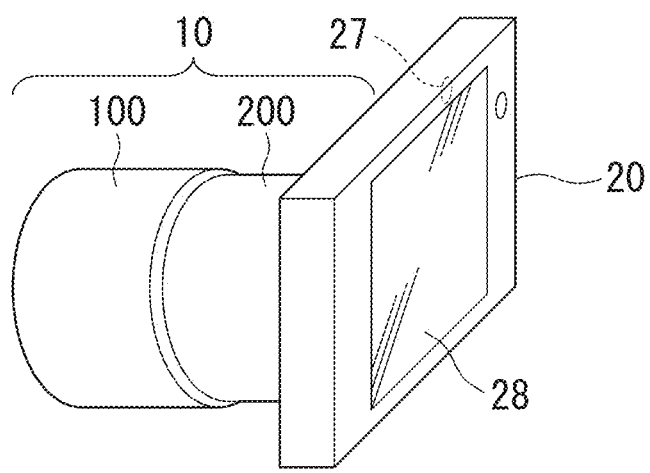
FIGS. 7A to 7D are diagrams illustrating a second method of detecting the physical contact state between the imaging device and the imaging operation terminal in the imaging system of this embodiment.
Figure 7B:
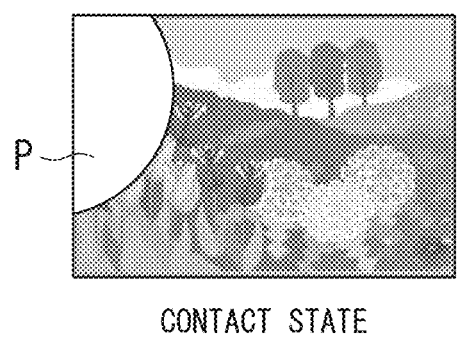
Figure 7C:
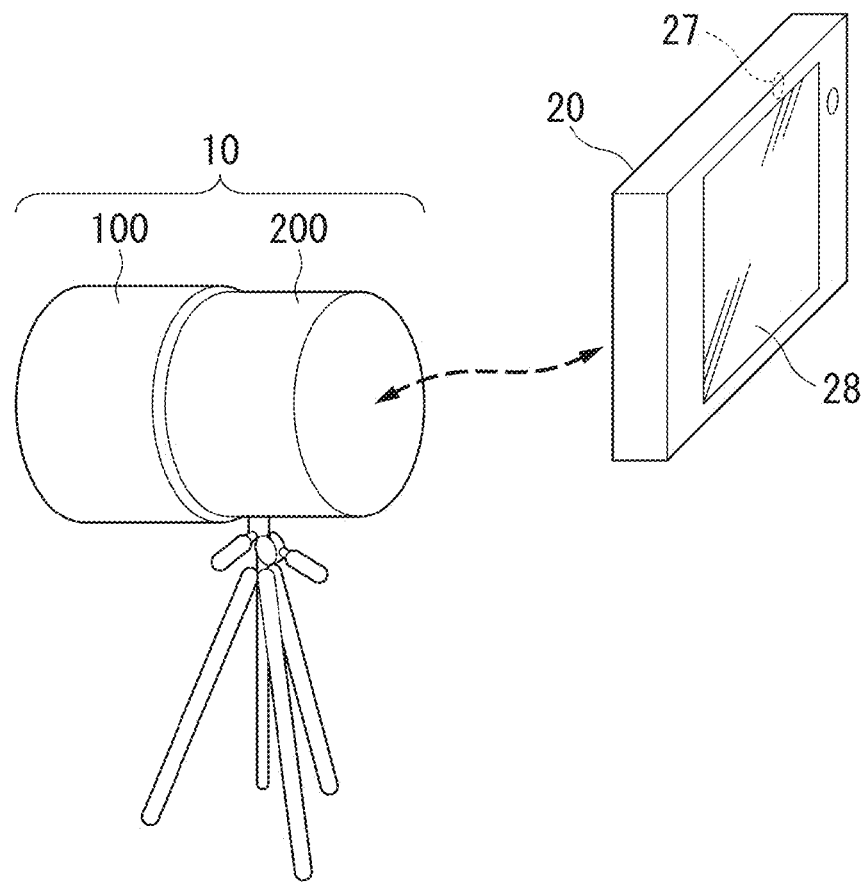
Figure 7D:

The physical state detection section 23 detects the physical contact state between the imaging device 10 and the imaging operation terminal 20 by checking the imaging device 10 photographed within the image captured by the backside camera 27. More specifically, when the imaging device 10 and the imaging operation terminal 20 are in the physical contact state (for example, the combined state) as illustrated in FIG. 7A, there is a region P in which the imaging device 10 appears within the image captured by the backside camera 27 as illustrated in FIG. 7B. In addition, when the imaging device 10 and the imaging operation terminal 20 are physically in the non-contact state (for example, the separated state) as illustrated in FIG. 7C, there is no region P in which the imaging device 10 appears within the image captured by the backside camera 27 as illustrated in FIG. 7D. In the second physical contact state detection method, the physical contact state between the imaging device 10 and the imaging operation terminal 20 is detected using the region P.

In FIGS. 7B and 7D, an example of the image captured by the backside camera 27 displayed on the display section 28 provided in the imaging operation terminal 20 is illustrated. However, when the physical state detection section 23 detects the physical contact state between the imaging device 10 and the imaging operation terminal 20, it is only necessary to perform a process of checking the region P in which the imaging device 10 appears from the image captured by the backside camera 27, for example, through image recognition, without the need to cause the display section 28 to display the image captured by the backside camera 27. Here, the image recognition in which the physical state detection section 23 recognizes the region P, for example, can be performed according to a process of detecting a predetermined shape of the imaging device 10 or a process of detecting a region in which a subject does not move within an image when the backside camera 27 captures a moving image.

Also, for example, when the imaging operation terminal 20 is a portable communication terminal such as a smartphone, a backside camera provided in the portable communication terminal can be used as the backside camera 27.

After power of the imaging device 10 and the imaging operation terminal 20 is turned ON and wireless communication between the imaging device 10 and the imaging operation terminal 20 has been established in the imaging system 1, the physical state detection section 23 starts the physical contact state detection according to the second physical contact state detection method after the backside camera 27 starts up.

Figure 8:
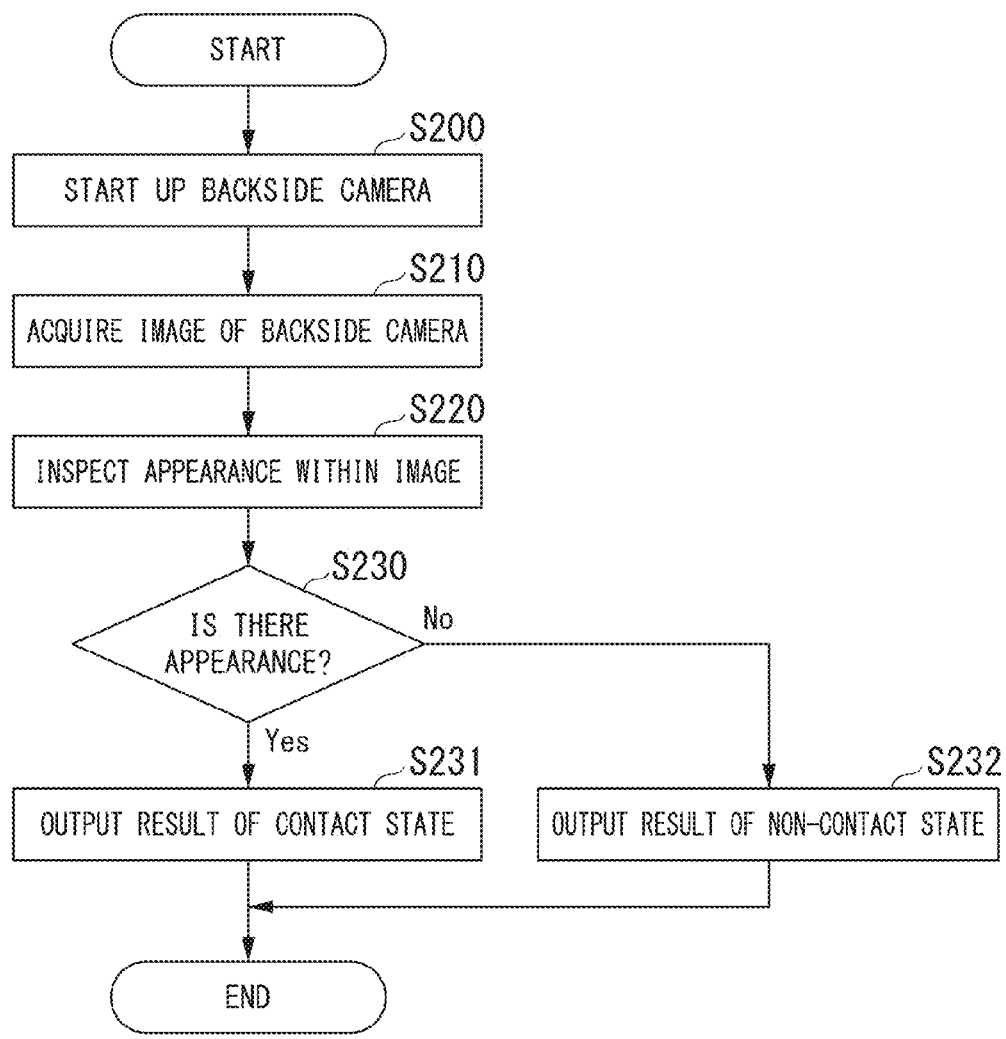
FIG. 8 is a flowchart illustrating a processing procedure of the second method of detecting the physical contact state between the imaging device and the imaging operation terminal in the imaging system of this embodiment.

Here, the second physical contact state detection process by the physical state detection section 23 will be described. FIG. 8 is a flowchart illustrating a processing procedure of the second method (second physical contact state detection process) of detecting the physical contact state between the imaging device 10 and the imaging operation terminal 20 in the imaging system 1 of this embodiment. After power of the imaging device 10 and the imaging operation terminal 20 is turned ON and wireless communication between the imaging device 10 and the imaging operation terminal 20 has been established, the physical state detection section 23 starts the second physical contact state detection process.

When starting the second physical contact state detection process, the physical state detection section 23 first starts up the backside camera 27 in step S200. Subsequently, in step S210, the physical state detection section 23 acquires an image captured by the backside camera 27.

Subsequently, in step S220, the physical state detection section 23 inspects the region P of the imaging device 10 appearing within the acquired image. Subsequently, in step S230, the physical state detection section 23 determines whether the imaging device 10 appears within the acquired image, i.e., whether there is a region P in which the imaging device 10 appears. Then, when the result of the determination of step S230 indicates that the imaging device 10 appears within the image ("Yes" in step S230), a result representing that the imaging device 10 and the imaging operation terminal 20 are in the physical contact state (for example, the combined state) is output in step S231 as the result of the second physical contact state detection process and the second physical contact state detection process ends. In addition, when the result of the determination of step S230 indicates that the imaging device 10 does not appear within the image ("No" in step S230), a result representing that the imaging device 10 and the imaging operation terminal 20 are physically in the non-contact state (for example, the separated state) is output in step S232 as the result of the second physical contact state detection process, and the second physical contact state detection process ends.

Thereby, in the second physical contact state detection process, the physical contact state between the imaging device 10 and the imaging operation terminal 20 is detected using an image captured by the backside camera 27 provided on the side with which the imaging device 10 is in physical contact in the imaging operation terminal 20. In addition, because a band of wireless communication to be performed between the imaging device 10 and the imaging operation terminal 20 is not used in the second physical contact state detection process, it is possible to detect the physical contact state without interfering with image data communication. In addition, because the backside camera prepared in the imaging operation terminal 20 can be used in the second physical contact state detection process, it is possible to implement a configuration for detecting the physical contact state at a low cost.

Also, even after the second physical contact state detection process has ended, it is desirable that the backside camera 27 start up, for example, sequentially or at cyclical intervals, an image captured by the backside camera 27 be acquired, and the physical state detection section 23 perform the second physical contact state detection process. Thereby, for example, in a state in which the user uses the imaging system 1, it is also possible to detect variation of the physical contact state between the imaging device 10 and the imaging operation terminal 20, and the operation mode selection section 24 can change a current operation mode to the operation mode according to the variation of the physical contact state.

(Third Physical Contact State Detection Method)

Figure 9:
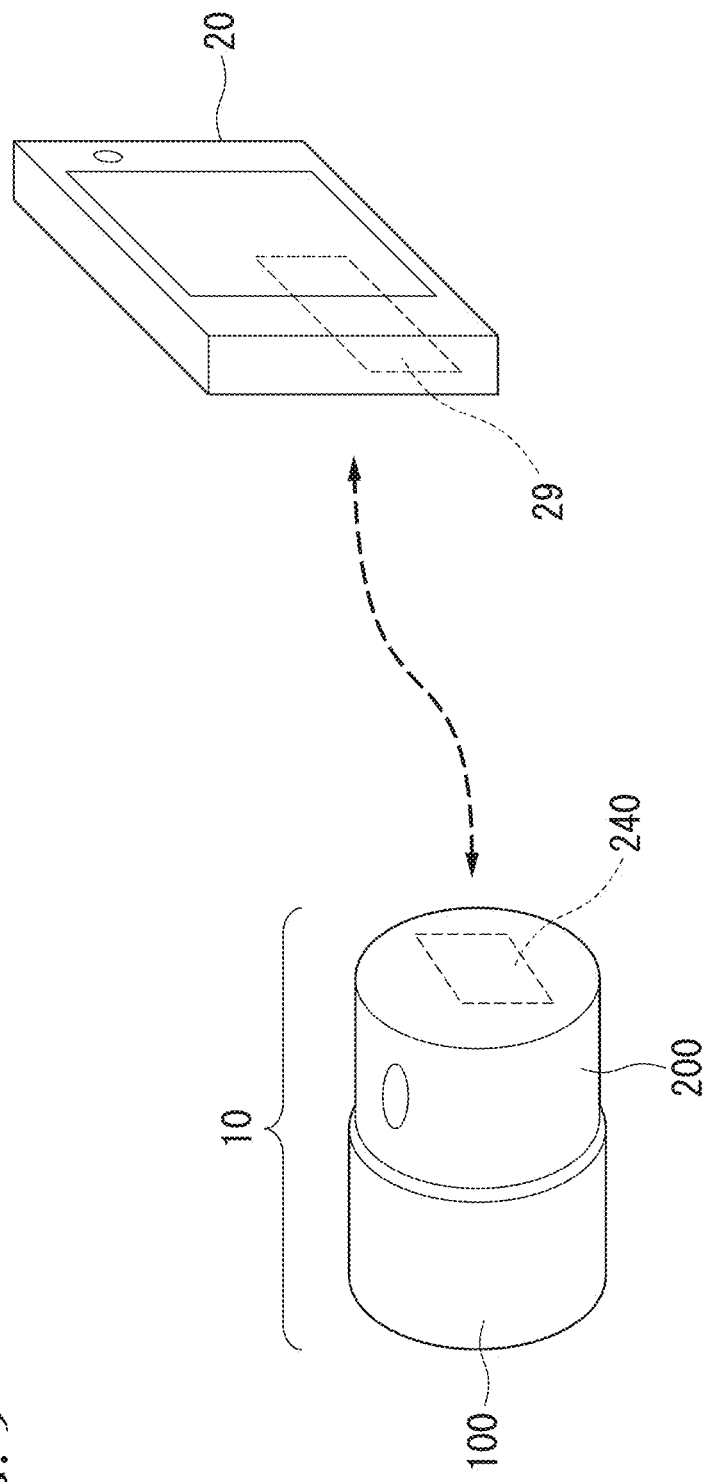
FIG. 9 is a diagram illustrating a third method of detecting the physical contact state between the imaging device and the imaging operation terminal in the imaging system of this embodiment.

Next, still another method of detecting the physical contact state between the imaging device 10 and the imaging operation terminal 20 in the physical state detection section 23 will be described. FIG. 9 is a diagram illustrating a third method (third physical contact state detection method) of detecting the physical contact state between the imaging device 10 and the imaging operation terminal 20 in the imaging system 1 of this embodiment. This third physical contact state detection method is a method of detecting the physical contact state between the imaging device 10 and the imaging operation terminal 20 using a proximity wireless communication section provided in each of the imaging device 10 and the imaging operation terminal 20 as illustrated in FIG. 9. In FIG. 9, an example when a proximity wireless communication section 240 provided in the imaging device 10 and a proximity wireless communication section 29 provided in the imaging operation terminal 20 perform proximity wireless communication is illustrated.

Also, for example, when the imaging operation terminal 20 is a portable communication terminal such as a smartphone, the proximity wireless communication section provided in the portable communication terminal can be used as the proximity wireless communication section 29. In addition, when the wireless communication section 220 provided in the imaging device 10 is provided with the proximity wireless communication function or when the wireless communication section 21 provided in the imaging operation terminal 20 is provided with the proximity wireless communication function, it is possible to use the proximity wireless communication function provided in each wireless communication section.

After power of the imaging device 10 and the imaging operation terminal 20 is turned ON and wireless communication between the imaging device 10 and the imaging operation terminal 20 has been established in the imaging system 1, the proximity wireless communication by the proximity wireless communication sections 240 and 29 starts and the physical state detection section 23 checks whether the proximity wireless communication has been established, thereby obtaining a detection result of the physical contact state between the imaging device 10 and the imaging operation terminal 20 in the third physical contact state detection method.

In this manner, the physical contact state between the imaging device 10 and the imaging operation terminal 20 is detected using the proximity wireless communication in the third physical contact state detection method. In addition, in the third physical contact state detection method, it is possible to reliably detect the physical contact state using the proximity wireless communication function prepared in the imaging device 10 and the imaging operation terminal 20.

Also, even after the third physical contact state detection method has ended, it is desirable that the establishment of the proximity wireless communication by the proximity wireless communication sections 240 and 29 be checked, for example, sequentially or at cyclical intervals, and the physical state detection section 23 perform the third physical contact state detection process. Thereby, for example, in a state in which the user uses the imaging system 1, it is also possible to detect variation of the physical contact state between the imaging device 10 and the imaging operation terminal 20, and the operation mode selection section 24 can change a current operation mode to the operation mode according to the variation of the physical contact state.

Also, a method of detecting the physical contact state between the imaging device 10 and the imaging operation terminal 20 is not limited to the above-described first, second, and third physical contact state detection methods. For example, a mechanical structure configured to detect the state of the physical contact with the imaging operation terminal 20 may be provided on the side of the imaging device 10, and a configuration may be made for notifying the imaging operation terminal 20 of information representing the state of the physical contact with the imaging operation terminal 20 detected by the imaging device 10 through wireless communication.

(Second Start-Up Process)

Figure 10:
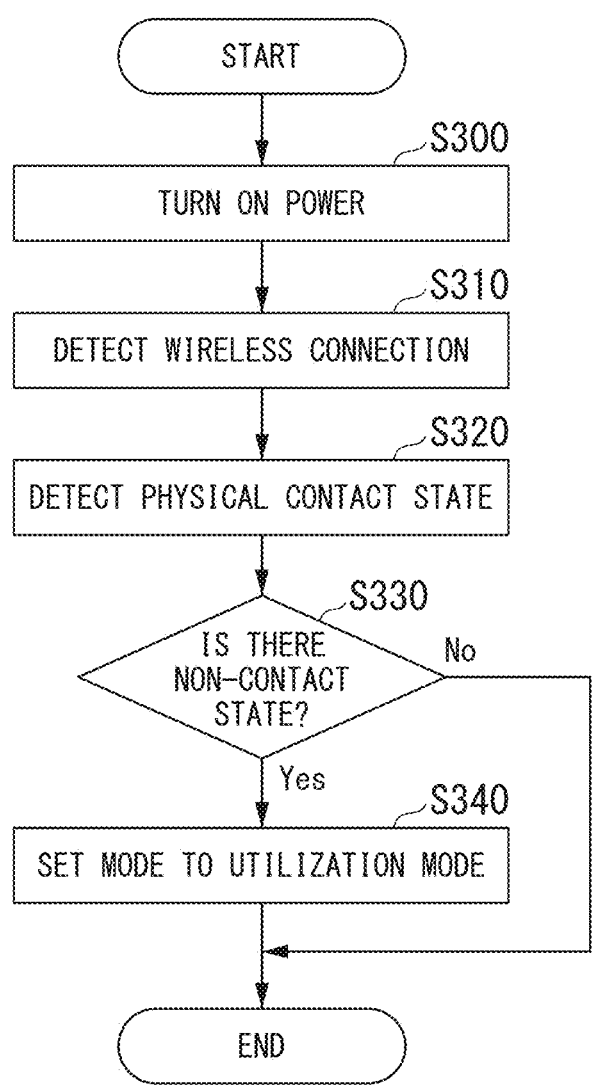
FIG. 10 is a flowchart illustrating a second processing procedure of starting up the imaging system of this embodiment.

Next, another processing procedure when the imaging system 1 starts up will be described. FIG. 10 is a flowchart illustrating a second processing procedure of starting up the imaging system 1 of this embodiment. In the following description, the utilization mode will be described as being set as the start-up mode (mode B illustrated in FIG. 3) of the separated state of the imaging device 10 and the imaging operation terminal 20 in the start-up mode table of the storage section 25.

When the user turns ON power of the imaging device 10 and the imaging operation terminal 20 in step S300, the start-up process of the imaging system 1 starts. When the start-up process of the imaging system 1 starts, the wireless communication detection section 22 detects a connection of wireless communication between the wireless communication section 21 and the imaging device 10 in step S310. Then, the wireless communication is established when wireless communication currently being performed by the wireless communication section 21 is communication with the wireless communication section 220 provided in the imaging device 10.

Subsequently, in step S320, the physical state detection section 23 detects the physical contact state between the imaging device 10 and the imaging operation terminal 20 using any of the above-described first, second or third physical contact state detection method. Subsequently, in step S330, the operation mode selection section 24 checks a result of the physical contact state between the imaging device 10 and the imaging operation terminal 20 detected by the physical state detection section 23. Then, when the result of the check of step S330 indicates that the result of the physical contact state between the imaging device 10 and the imaging operation terminal 20 detected by the physical state detection section 23 is the non-contact state, i.e., the separated state ("Yes" in step S330), the process proceeds to step S340.

Then, the operation mode selection section 24 sets the operation mode in which the imaging system 1 starts up to the utilization mode by referring to the start-up mode table stored in the storage section 25 in step S340, and ends the start-up process of the imaging system 1. Accordingly, the imaging operation terminal 20 can start up software according to the set utilization mode. For example, when the imaging operation terminal 20 is a portable communication terminal such as a smartphone, it is possible to start up application software according to the utilization mode.

Also, an example in which the start-up process of the imaging system 1 ends when the result of the check of step S330 indicates that the result of the physical contact state between the imaging device 10 and the imaging operation terminal 20 detected by the physical state detection section 23 is not the non-contact state ("No" in step S330) is illustrated in the flowchart representing the second processing procedure illustrated in FIG. 10. That is, the case in which the operation mode selection section 24 does not set any operation mode as the operation mode in which the imaging system 1 starts up is shown. However, when the result of the physical contact state detected by the physical state detection section 23 is not the non-contact state, for example, the imaging device 10 and the imaging operation terminal 20 are considered to be in the combined state. In this case, when the shooting mode is set as the start-up mode when the imaging system 1 has started up in the combined state in the start-up mode table stored in the storage section 25, the operation mode selection section 24 can set the operation mode in which the imaging system 1 starts up to the shooting mode by referring to the start-up mode table stored in the storage section 25. Thereby, the imaging operation terminal 20 can start up software according to the set shooting mode. For example, when the imaging operation terminal 20 is a portable communication terminal such as a smartphone, it is possible to start up application software according to the shooting mode. Also, the operation mode selection section 24 can set the mode to the operation mode set when the power of the imaging device 10 and the imaging operation terminal 20 was previously turned OFF.

(Third Start-Up Process)

Figures 11A, 11B:
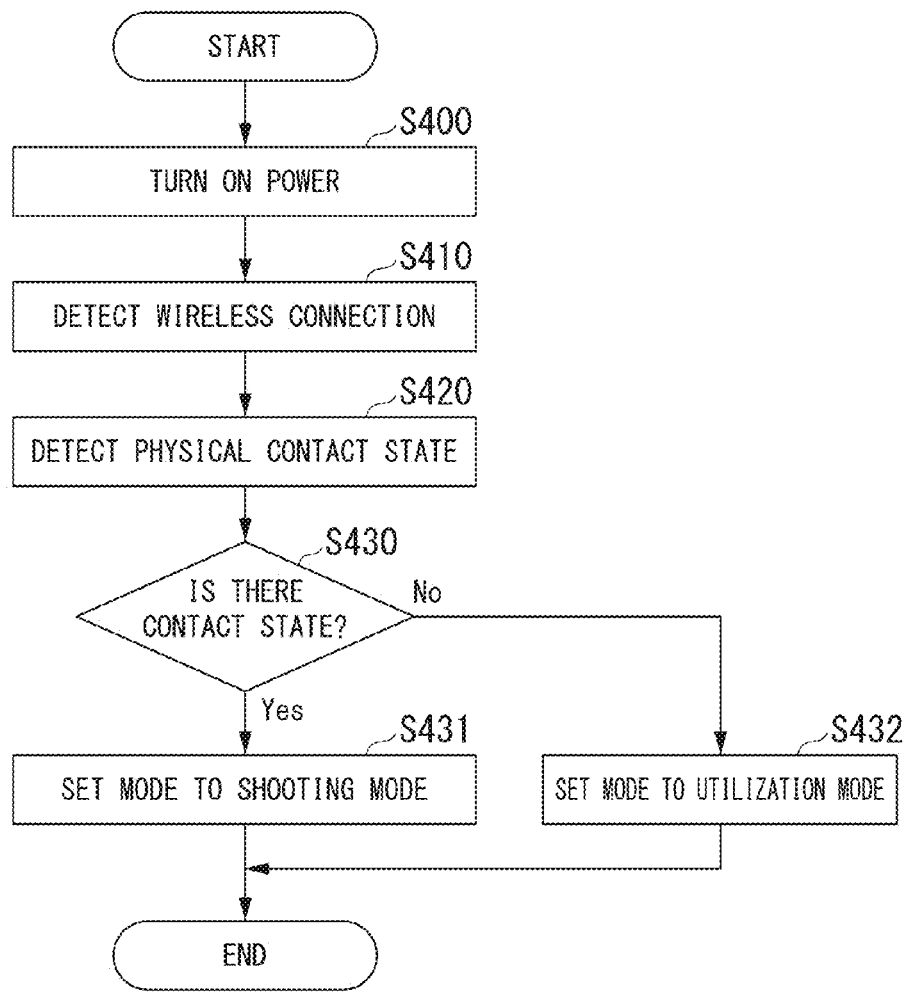
FIGS. 11A and 11B are a start-up mode table and a flowchart illustrating a third processing procedure of starting up the imaging system of this embodiment, respectively.

Next, still another processing procedure when the imaging system 1 starts up will be described. FIGS. 11A and 11B are a start-up mode table and a flowchart illustrating a third processing procedure of starting up the imaging system 1 of this embodiment, respectively. Also, in the description of the flowchart of the third start-up process illustrated in FIG. 11B, as illustrated in FIG. 11A, the shooting mode will be described as being set as the start-up mode of the combined state of the imaging device 10 and the imaging operation terminal 20 in the start-up mode table of the storage section 25 and the utilization mode will be described as being set as the start-up mode of the separated state of the imaging device 10 and the imaging operation terminal 20. That is, the shooting mode will be described as being set as mode A of the start-up mode table illustrated in FIG. 3 and the utilization mode will be described as being set as mode B.

When the user turns ON power of the imaging device 10 and the imaging operation terminal 20 in step S400, a start-up process of the imaging system 1 starts. When the start-up process of the imaging system 1 starts, the wireless communication detection section 22 detects a connection of wireless communication between the wireless communication section 21 and the imaging device 10 in step S410. Then, when the wireless communication currently being performed by the wireless communication section 21 is communication with the wireless communication section 220 provided in the imaging device 10, the wireless communication is established.

Subsequently, in step S420, the physical state detection section 23 detects the physical contact state between the imaging device 10 and the imaging operation terminal 20 using any of the above-described first, second, or third physical contact state detection method. Subsequently, in step S430, the operation mode selection section 24 checks a result of the physical contact state between the imaging device 10 and the imaging operation terminal 20 detected by the physical state detection section 23. Then, when the result of the check of step S430 indicates that the result of the physical contact state between the imaging device 10 and the imaging operation terminal 20 detected by the physical state detection section 23 is the contact state, i.e., the combined state ("Yes" in step S430), the process proceeds to step S431.

Then, the operation mode selection section 24 sets the operation mode in which the imaging system 1 starts up to the shooting mode by referring to the start-up mode table stored in the storage section 25 in step S431, and ends the start-up process of the imaging system 1. Accordingly, the imaging operation terminal 20 can start up software according to the set shooting mode. For example, when the imaging operation terminal 20 is a portable communication terminal such as a smartphone, it is possible to start up application software corresponding to the shooting mode.

Also, when the result of the check of step S430 indicates that the result of the physical contact state between the imaging device 10 and the imaging operation terminal 20 detected by the physical state detection section 23 is the non-contact state, i.e., the separated state ("No" in step S430), the process proceeds to step S431.

Then, the operation mode selection section 24 sets the operation mode in which the imaging system 1 starts up to the utilization mode by referring to the start-up mode table stored in the storage section 25 in step S432, and ends the start-up process of the imaging system 1. Accordingly, the imaging operation terminal 20 can start up software according to the set utilization mode. For example, when the imaging operation terminal 20 is a portable communication terminal such as a smartphone, it is possible to start up application software corresponding to the utilization mode.

In this manner, in the imaging system 1, it is possible to automatically switch the start-up mode to be initially used by the user when the imaging system 1 has started up according to the physical contact state between the imaging device 10 and the imaging operation terminal 20. Thereby, the imaging operation terminal 20 can automatically start up software according to the shooting mode, the utilization mode, or the like intended by the user. For example, when the imaging operation terminal 20 is a portable communication terminal such as a smartphone, it is possible to automatically start up application software according to the shooting mode or the utilization mode.

However, when the user desires to use the imaging system 1 for another purpose, the automatically started-up start-up mode does not match the current use purpose of the user, i.e., may not be the start-up mode intended by the user. In this case, it is necessary to set the mode to another operation mode by canceling the setting of the selected current operation mode (start-up mode) in a method of any of the above-described first, second, or third start-up process. Thus, the imaging operation terminal 20 includes a configuration for resetting to another operation mode by canceling the setting of the current operation mode (start-up mode).

Figure 12:
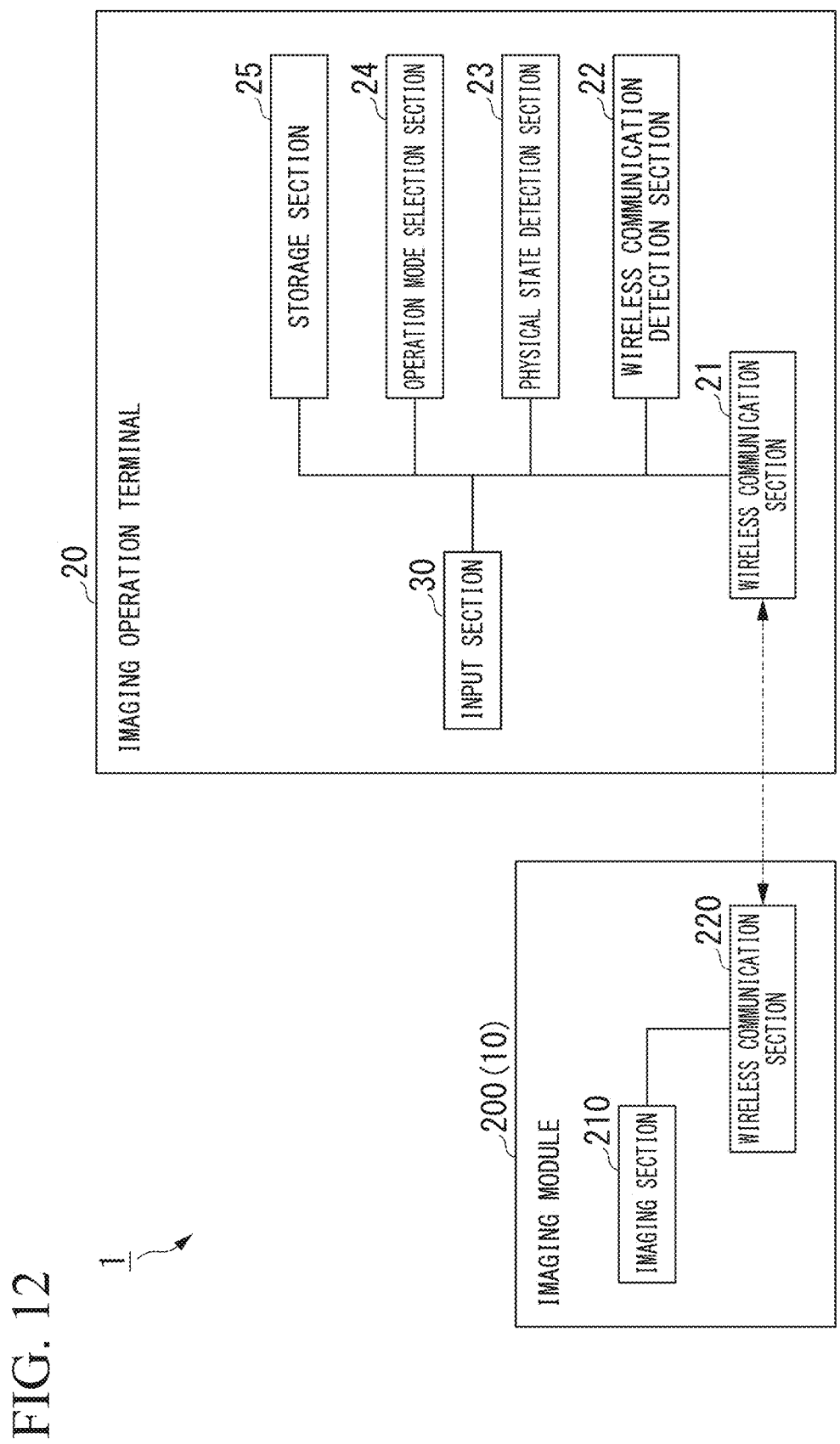
FIG. 12 is a block diagram illustrating an example of a configuration in which an operation mode set in the imaging system of this embodiment is canceled.

FIG. 12 is a block diagram illustrating an example of a configuration which can cancel an operation mode set in the imaging system 1 of this embodiment. In FIG. 12, an input section 30 for canceling the set operation mode is illustrated in addition to the block diagram of the imaging system 1 illustrated in FIG. 2. The input section 30 is operated by the user and is a user interface in the form of a button or a switch provided in the imaging operation terminal 20. According to an operation by the user, the input section 30 notifies the operation mode selection section 24 of the fact that an instruction to cancel the set operation mode has been input.

Also, the input section 30, for example, may be a touch pad or a touch panel configured with the display section 28 instead of being configured only in the form of a button or a switch. In addition, for example, when the imaging operation terminal 20 is a portable communication terminal such as a smartphone, an input function of the touch panel provided in the portable communication terminal can be used as the input section 30. In addition, the input section 30, for example, may be configured to receive an instruction to cancel the set operation mode according to another method such as the user shaking the imaging operation terminal 20.

(Operation Mode Cancellation Process)

Figures 13, 14:
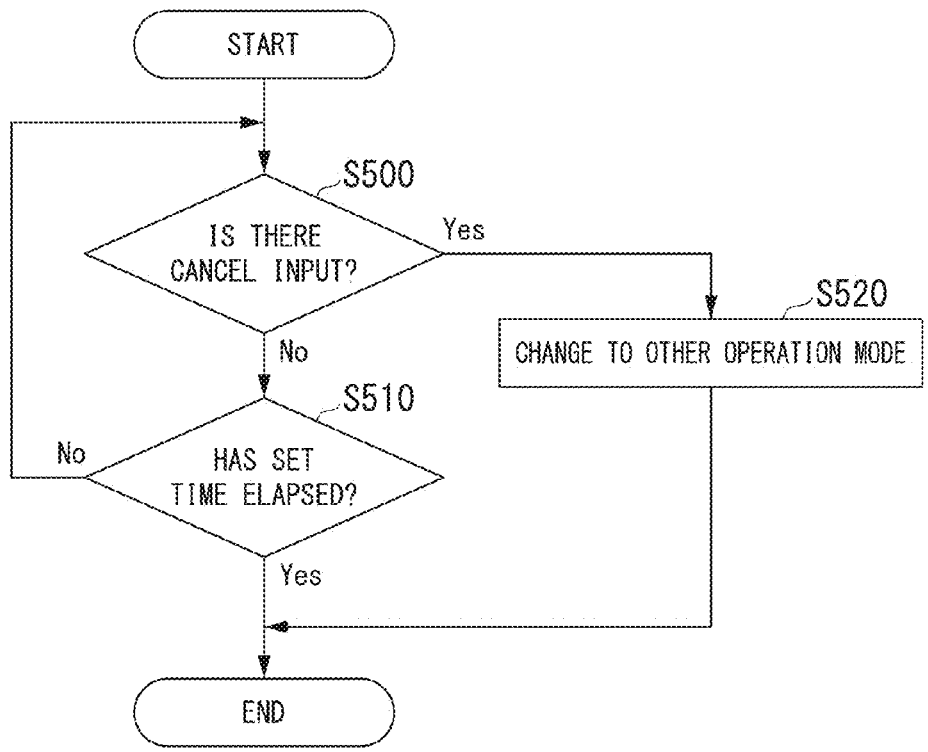
FIG. 13 is a flowchart illustrating a processing procedure of canceling the operation mode set in the imaging system of this embodiment.
FIG. 14 is a diagram illustrating an operation table when the physical contact state between the imaging device and the imaging operation terminal has changed in the imaging system of this embodiment.

Next, a processing procedure when the operation mode set in the imaging system 1 is canceled will be described. FIG. 13 is a flowchart illustrating a processing procedure of canceling the operation mode set in the imaging system 1 of this embodiment. After power of the imaging device 10 and the imaging operation terminal 20 is turned ON, wireless communication between the imaging device 10 and the imaging operation terminal 20 is established, and the operation mode according to the physical contact state is set in the imaging system 1, the cancellation process for canceling the operation mode starts.

When the cancellation process of the operation mode starts in the imaging system 1, the operation mode selection section 24 checks whether there is a notification input (hereinafter referred to as a "cancel input") for canceling the operation mode from the input section 30 in step S500. Then, when the result of the check of step S500 indicates that there is no cancel input from the input section 30 ("No" in step S500), the process proceeds to step S510.

Subsequently, in step S510, the operation mode selection section 24 determines whether a predetermined set time has elapsed. The predetermined set time to be determined in step S510 is a cancel input reception period during which the imaging operation terminal 20 receives the cancellation of the operation mode from the user. Then, when the result of the determination of step S510 indicates that the predetermined set time has not elapsed, i.e., that the cancel input reception period has not ended ("No" in step S510), the operation mode selection section 24 returns to step S500 and iterates the check of whether there is a cancel input until a predetermined cancel input reception period ends. In addition, when the result of the determination of step S510 indicates that the predetermined set time has elapsed, i.e., that the cancel input reception period has ended ("Yes" in step S510), the operation mode selection section 24 ends the operation mode cancellation process.

In addition, when the result of the check of step S500 indicates that there is a cancel input from the input section 30 ("Yes" in step S500), the process proceeds to step S520. Subsequently, in step S520, the operation mode selection section 24 cancels the setting of the current operation mode and changes to the setting of another operation mode. For example, a change to the utilization mode is performed when the current operation mode is the shooting mode and a change to the shooting mode is performed when the current operation mode is the utilization mode. Then, the operation mode selection section 24 ends the operation mode cancellation process.

In this manner, when the operation mode (start-up mode) automatically starting up according to the physical contact state between the imaging device 10 and the imaging operation terminal 20 in the imaging system 1 is an unintended operation mode, it is possible to change to another operation mode by operating the imaging operation terminal 20 within a predetermined set time.

Next, an operation when the physical contact state between the imaging device 10 and the imaging operation terminal 20 varies in a state in which the imaging system 1 is used will be described. In the imaging system 1, the operation mode selection section 24 refers to the setting of the operation mode stored in the storage section 25 and changes the operation mode to be executed by the imaging operation terminal 20 according to the physical contact state change between the imaging device 10 and the imaging operation terminal 20. That is, the operation mode selection section 24 sets the operation mode once more. First, an operation mode to which a change is directed according to the variation of the physical contact state between the imaging device 10 and the imaging operation terminal 20 in the imaging system 1 stored in the storage section 25 will be described. FIG. 14 is a diagram illustrating an operation table when the physical contact state between the imaging device 10 and the imaging operation terminal 20 has changed in the imaging system 1 of this embodiment.

As described above, the imaging system 1 includes a plurality of operation modes such as the shooting mode in which shooting is performed by the imaging device 10 and the utilization mode in which an image obtained by the shooting is utilized. Then, as described above, the imaging system 1 can be used regardless of whether the imaging device 10 and the imaging operation terminal 20 are in the combined state or the separated state. For example, in the imaging system 1, it is possible to perform shooting when the imaging device 10 and the imaging operation terminal 20 are in either state. In addition, in the imaging system 1, it is possible to replace the imaging device 10 which performs wireless communication with the imaging operation terminal 20 when the imaging device 10 and the imaging operation terminal 20 are in either state. In addition, in the imaging system 1, it is possible to end the use of the imaging system 1 when the imaging device 10 and the imaging operation terminal 20 are in either state. In this case, it is possible to transmit a command to turn OFF power from the imaging operation terminal 20 to the imaging device 10.

Thus, the operation table when the physical contact state has changed for changing the setting or operation of the current operation mode to another operation mode or operation according to variation of the physical contact state between the imaging device 10 and the imaging operation terminal 20 is prepared in the storage section 25. The user can freely preset the operation mode to be used after the physical contact state between the imaging device 10 and the imaging operation terminal 20 has been changed in the operation table when the physical contact state has changed. For example, the user can set the utilization mode as the operation mode (mode C illustrated in FIG. 14) when the physical contact state between the imaging device 10 and the imaging operation terminal 20 changes from the combined state to the separated state in a state in which the imaging system 1 is used in the shooting mode. In addition, the user can set the shooting mode as the operation mode (mode D illustrated in FIG. 14), i.e., perform the setting to maintain the current operation mode without changing the operation mode, when the physical contact state between the imaging device 10 and the imaging operation terminal 20 changes from the separated state to the combined state in a state in which the imaging system 1 is used in the shooting mode. In addition, the user can set the utilization mode as the operation mode (mode E illustrated in FIG. 14), i.e., perform the setting to maintain the current operation mode and further perform the setting to turn OFF the power of the imaging device 10, when the physical contact state between the imaging device 10 and the imaging operation terminal 20 changes from the combined state to the separated state in a state in which the imaging system 1 is used in the utilization mode. In addition, the user can set the shooting mode as the operation mode (mode F illustrated in FIG. 14) when the physical contact state between the imaging device 10 and the imaging operation terminal 20 changes from the separated state to the combined state in a state in which the imaging system 1 is used in the utilization mode.

Thereby, the operation mode selection section 24 can automatically select the operation mode for a change when the physical contact state between the imaging device 10 and the imaging operation terminal 20 varies by referring to the operation table when the physical contact state has changed stored in the storage section 25. Thereby, the imaging operation terminal 20 can automatically start up software according to the operation mode after the change without selecting the operation mode to be used next every time the physical contact state between the imaging device 10 and the imaging operation terminal 20 changes in a state in which the user uses the imaging system 1. For example, when the imaging operation terminal 20 is a portable communication terminal such as a smartphone, it is possible to automatically start up application software according to the operation mode after the change.

(First Operation Mode Change Process)

Figures 15A, 15B:
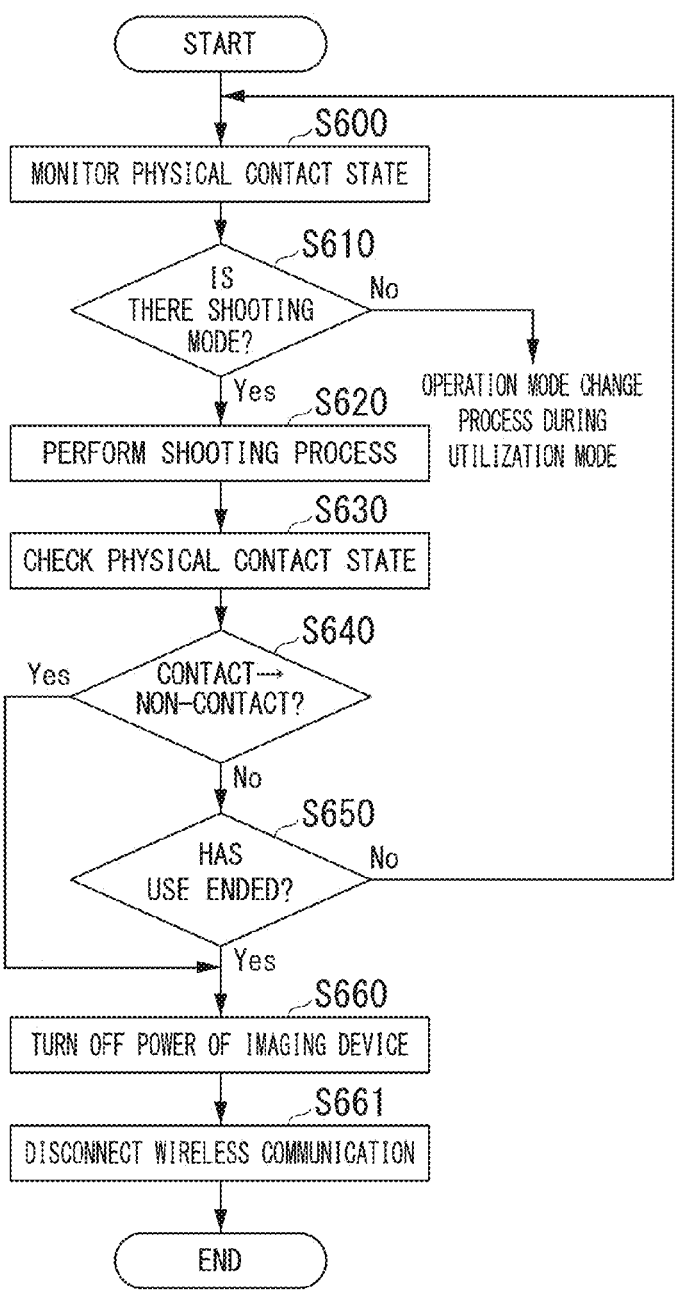
FIGS. 15A and 15B are an operation table and a flowchart illustrating a processing procedure of a first method of changing the operation mode when the physical contact state between the imaging device and the imaging operation terminal has changed in the imaging system of this embodiment, respectively.

Next, a processing procedure when the operation mode of the imaging system 1 changes will be described. FIGS. 15A and 15B are an operation table and a flowchart illustrating a processing procedure of a first method of changing the operation mode when the physical contact state between the imaging device 10 and the imaging operation terminal 20 has changed in the imaging system 1 of this embodiment, respectively. The operation mode change process when the physical contact state between the imaging device 10 and the imaging operation terminal 20 varies when the user uses the imaging system 1 in the shooting mode will be described with reference to FIGS. 15A and 15B. Also, in the description of the flowchart of the first operation mode change process illustrated in FIG. 15B, as illustrated in FIG. 15A, the setting for turning OFF the power of the imaging device 10 will be described as being performed as the operation mode (mode C illustrated in FIG. 14) when the state changes from the combined state to the separated state in the operation table when the physical contact state has changed of the storage section 25 and the operation mode (mode D illustrated in FIG. 14) when the state changes from the separated state to the combined state will be described as being set without changing the operation mode.

When the user turns ON the power of the imaging device 10 and the imaging operation terminal 20, a method of any one of the above-described first, second, and third start-up processes or the operation mode changed by the user is set. Then, the first operation mode change process of the imaging system 1 starts.

When the first operation mode change process of the imaging system 1 starts, the operation mode selection section 24 monitors the physical contact state in step S600. Subsequently, in step S610, the operation mode selection section 24 checks whether the current operation mode is the shooting mode. Then, when the result of the check of step S610 indicates that the current operation mode is not the shooting mode ("No" in step S610), the process proceeds to the operation mode change process during the utilization mode as will be described later.

In addition, when the result of the check of step S610 indicates that the current operation mode is the shooting mode ("Yes" in step S610), the process proceeds to step S620 and a shooting process in the shooting mode is performed.

Subsequently, in step S630, the physical state detection section 23 detects the physical contact state between the imaging device 10 and the imaging operation terminal 20 in any of the above-described first, second, or third physical contact state detection method. Then, the physical state detection section 23 outputs information about the detected current physical contact state between the imaging device 10 and the imaging operation terminal 20 to the operation mode selection section 24.

Subsequently, in step S640, the operation mode selection section 24 checks whether the physical contact state between the imaging device 10 and the imaging operation terminal 20 has changed from the contact state to the non-contact state, i.e., whether the physical contact state has changed from the combined state to the separated state. Then, when the result of the check of step S640 indicates that the physical contact state between the imaging device 10 and the imaging operation terminal 20 has not changed from the contact state to the non-contact state, i.e., that the combined state of the imaging device 10 and the imaging operation terminal 20 has not changed, or when the physical contact state has changed from the separated state to the combined state ("No" in step S640), the setting of the current operation mode (shooting mode) is maintained by referring to the operation table when the physical contact state has changed stored in the storage section 25. Then, the operation mode selection section 24 proceeds to step S650.

Subsequently, in step S650, the operation mode selection section 24 checks whether the use of the imaging system 1 ends. Then, when the result of the check of step S650 indicates that the use of the imaging system 1 does not end ("No" in step S650), the operation mode selection section 24 returns to step S600 and iterates the check of the variation of the physical contact state between the imaging device 10 and the imaging operation terminal 20 of steps S610 to S640 without changing the setting of the current operation mode (shooting mode).

In addition, when the result of the check of step S650 indicates that the use of the imaging system 1 ends ("Yes" in step S650), the operation mode selection section 24 proceeds to step S660.

In addition, when the result of the check of step S640 indicates that the physical contact state between the imaging device 10 and the imaging operation terminal 20 has changed from the contact state to the non-contact state, i.e., that the imaging device 10 and the imaging operation terminal 20 have changed from the combined state to the separated state ("Yes" in step S640), the process proceeds to step S660.

Subsequently, in step S660, the operation mode selection section 24 causes the wireless communication section 21 to transmit a command for turning OFF the power of the imaging device 10 by referring to the operation table when the physical contact state has changed stored in the storage section 25. Thereby, in step S661, the imaging device 10 receives the command for turning OFF the power from the imaging operation terminal 20, disconnects wireless communication from the imaging operation terminal 20, and turns OFF the power of the imaging device 10 itself. When the wireless communication detection section 22 detects the disconnection of the wireless communication between the wireless communication section 21 and the imaging device 10, the first operation mode change process ends.

Thereby, when the user uses the imaging system 1 in the shooting mode in the first operation mode change process, the variation of the physical contact state between the imaging device 10 and the imaging operation terminal 20 is checked sequentially or at cyclical intervals and the operation mode is automatically changed according to the variation of the physical contact state between the imaging device 10 and the imaging operation terminal 20. In addition, when the physical contact state between the imaging device 10 and the imaging operation terminal 20 has changed from the combined state to the separated state, the power of the imaging device 10 is turned OFF. Thereby, the user can more comfortably use the imaging system 1 without the need to perform the selection of the operation mode every time the physical contact state between the imaging device 10 and the imaging operation terminal 20 changes or an operation of turning OFF the power when the use of the imaging device 10 ends. In addition, it is possible to prevent the imaging device 10 from consuming extra power by turning OFF the power of the imaging device 10 and reduce power consumption of the imaging system 1.

Also, a method of transmitting the command for turning OFF the power of the imaging device 10 is not limited to a configuration in which the command is automatically transmitted as described above. For example, a configuration can be made to display a query of whether to actually turn OFF the power of the imaging device 10 on the display section 28 provided in the imaging operation terminal 20 and transmit the command for turning OFF the power of the imaging device 10 after the user has input an instruction for turning OFF the power of the imaging device 10 by operating the input section 30.

(Second Operation Mode Change Process)

Figure 16B:
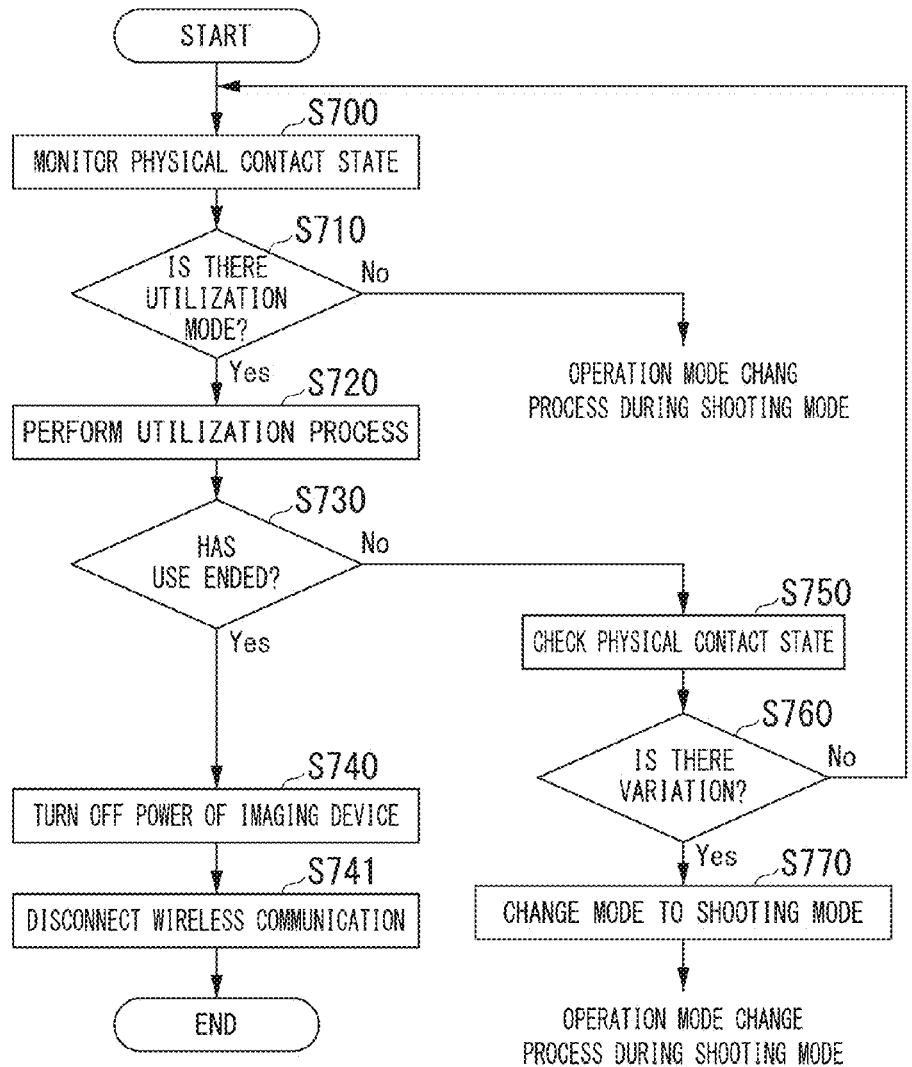

Next, another processing procedure when the operation mode of the imaging system 1 is changed will be described. FIGS. 16A and 16B are an operation table and a flowchart illustrating a processing procedure of a second method of changing the operation mode when the physical contact state between the imaging device 10 and the imaging operation terminal 20 has changed in the imaging system 1 of this embodiment, respectively. The operation mode change process when the physical contact state between the imaging device 10 and the imaging operation terminal 20 has varied when the user uses the imaging system 1 in the utilization mode will be described with reference to FIGS. 16A and 16B. The second operation mode change process illustrated in FIGS. 16A and 16B is a process based on a concept that a change of the physical contact state between the imaging device 10 and the imaging operation terminal 20 when the user uses the imaging system 1 in the utilization mode represents an intention of the user to perform shooting using the imaging system 1. Also, in the description of the flowchart of the second operation mode change process illustrated in FIG. 16B, as illustrated in FIG. 16A, the shooting mode will be described as being set in each of the operation mode (mode E illustrated in FIG. 14) when the state changes from the combined state to the separated state and the operation mode (mode F illustrated in FIG. 14) when the state changes from the separated state to the combined state in the operation table when the physical contact state has changed of the storage section 25.

When the user turns ON the power of the imaging device 10 and the imaging operation terminal 20, a method of any one of the above-described first, second, and third start-up processes or the operation mode changed by the user is set. Then, the second operation mode change process of the imaging system 1 starts.

When the second operation mode change process of the imaging system 1 starts, the operation mode selection section 24 monitors the physical contact state in step S700. Subsequently, in step S710, the operation mode selection section 24 checks whether the current operation mode is the utilization mode. Then, when the result of the check of step S710 indicates that the current operation mode is not the utilization mode ("No" in step S710), the process proceeds to the operation mode change process during the shooting mode described in the above-described flowchart illustrated in FIGS. 15A and 15B.

In addition, when the result of the check of step S710 indicates that the current operation mode is the utilization mode ("Yes" in step S710), the process proceeds to step S720 and a utilization process in the utilization mode (for example, a process in the playback mode, the processing mode or the imaging transmission mode utilizing a captured image) is performed.

Subsequently, in step S730, the operation mode selection section 24 checks whether the use of the imaging system 1 ends. Then, when the result of the check of step S730 indicates that the use of the imaging system 1 ends ("Yes" in step S730), the operation mode selection section 24 proceeds to step S740 and causes the wireless communication section 21 to transmit a command for turning OFF the power of the imaging device 10. Thereby, in step S741, the imaging device 10 receives the command for turning OFF the power from the imaging operation terminal 20, disconnects wireless communication with the imaging operation terminal 20, and turns OFF the power of the imaging device 10 itself. When the wireless communication detection section 22 detects the disconnection of the wireless communication between the wireless communication section 21 and the imaging device 10, the second operation mode change process ends.

In addition, when the result of the check of step S730 indicates that the use of the imaging system 1 does not end ("No" in step S730), the operation mode selection section 24 proceeds to step S750.

Subsequently, in step S750, the physical state detection section 23 detects the physical contact state between the imaging device 10 and the imaging operation terminal 20 in any of the above-described first, second, or third physical contact state detection method. Then, the physical state detection section 23 outputs information about the detected current physical contact state between the imaging device 10 and the imaging operation terminal 20 to the operation mode selection section 24.

Subsequently, in step S760, the operation mode selection section 24 checks whether the physical contact state between the imaging device 10 and the imaging operation terminal 20 has changed, i.e., whether the physical contact state has changed from the combined state to the separated state or from the separated state to the combined state. Then, when the result of the check of step S760 indicates that the physical contact state between the imaging device 10 and the imaging operation terminal 20 does not vary ("No" in step S760), the setting of the current operation mode (utilization mode) is maintained and the check of the end of the use of the imaging system 1 of steps S710 to S730, i.e., the check of the end of the utilization mode, is iterated by returning to step S700.

In addition, when the result of the check of step S760 indicates that the physical contact state between the imaging device 10 and the imaging operation terminal 20 varies ("Yes" in step S760), the operation mode selection section 24 proceeds to step S770, cancels the setting of the current operation mode (utilization mode), and changes the operation mode to the shooting mode by referring to the operation table when the physical contact state has changed stored in the storage section 25. Thereby, the second operation mode change process is turned over to the first operation mode change process which is the operation mode change process during the above-described shooting mode.

Thereby, when the user uses the imaging system 1 in the utilization mode in the second operation mode change process, the variation of the physical contact state between the imaging device 10 and the imaging operation terminal 20 is checked sequentially or at cyclical intervals and the operation mode is automatically changed to the shooting mode if the physical contact state between the imaging device 10 and the imaging operation terminal 20 varies. In addition, when the use of the imaging system 1 ends, the power of the imaging device 10 is turned OFF. Thereby, the user can more comfortably use the imaging system 1 and reduce the power consumption of the imaging system 1 without the need to perform a change of the operation mode to the shooting mode when shooting is performed using the imaging system 1 or an operation of turning OFF the power when the use of the imaging device 10 ends.

(Third Operation Mode Change Process)

Next, still another processing procedure when the operation mode of the imaging system 1 is changed will be described. FIGS. 17A and 17B are an operation table and a flowchart illustrating a processing procedure of a third method of changing the operation mode when the physical contact state between the imaging device 10 and the imaging operation terminal 20 has changed in the imaging system 1 of this embodiment, respectively. Another operation mode change process when the physical contact state between the imaging device 10 and the imaging operation terminal 20 has varied when the user uses the imaging system 1 in the utilization mode will be described with reference to FIGS. 17A and 17B. The third operation mode change process illustrated in FIGS. 17A and 17B is a process based on a concept that separating the imaging device 10 from the imaging operation terminal 20 represents an intention of the user to end shooting using the imaging system 1 when the user uses the imaging system 1 in the utilization mode and combining the imaging device 10 with the imaging operation terminal 20 represents an intention of the user to perform shooting using the imaging system 1. Also, in the description of the flowchart of the third operation mode change process illustrated in FIG. 17B, as illustrated in FIG. 17A, a setting for turning OFF the power of the imaging device 10 will be described as being performed as the operation mode (mode E illustrated in FIG. 14) without changing the operation mode when the state changes from the combined state to the separated state in the operation table when the physical contact state has changed of the storage section 25 and the shooting mode will be described as being set as the operation mode (mode F illustrated in FIG. 14) when the state changes from the separated state to the combined state.

When the user turns ON the power of the imaging device 10 and the imaging operation terminal 20, a method of any one of the above-described first, second, and third start-up processes or the operation mode changed by the user is set. Then, the third operation mode change process of the imaging system 1 starts.

When the third operation mode change process of the imaging system 1 starts, the operation mode selection section 24 monitors the physical contact state in step S800. Subsequently, in step S810, the operation mode selection section 24 checks whether the current operation mode is the utilization mode. Then, when the result of the check of step S810 indicates that the current operation mode is not the utilization mode ("No" in step S810), the process proceeds to the operation mode change process during the shooting mode described in the above-described flowchart illustrated in FIGS. 15A and 15B.

In addition, when the result of the check of step S810 indicates that the current operation mode is the utilization mode ("Yes" in step S810), the process proceeds to step S820 and a utilization process in the utilization mode is performed.

Subsequently, in step S830, the operation mode selection section 24 checks whether the use of the imaging system 1 ends. Then, when the result of the check of step S830 indicates that the use of the imaging system 1 ends ("Yes" in step S830), the operation mode selection section 24 proceeds to step S840 and causes the wireless communication section 21 to transmit a command for turning OFF the power of the imaging device 10. Thereby, in step S841, the imaging device 10 receives the command for turning OFF the power from the imaging operation terminal 20, disconnects wireless communication with the imaging operation terminal 20, and turns OFF the power of the imaging device 10 itself. When the wireless communication detection section 22 detects the disconnection of the wireless communication between the wireless communication section 21 and the imaging device 10, the third operation mode change process ends.

In addition, when the result of the check of step S830 indicates that the use of the imaging system 1 does not end ("No" in step S830), the operation mode selection section 24 proceeds to step S850.

Subsequently, in step S850, the physical state detection section 23 detects the physical contact state between the imaging device 10 and the imaging operation terminal 20 in any of the above-described first, second, or third physical contact state detection method. Then, the physical state detection section 23 outputs information about the detected current physical contact state between the imaging device 10 and the imaging operation terminal 20 to the operation mode selection section 24.

Subsequently, in step S860, the operation mode selection section 24 checks whether the physical contact state between the imaging device 10 and the imaging operation terminal 20 has changed from the contact state to the non-contact state, i.e., whether the physical contact state has changed from the combined state to the separated state. In addition, when the result of the check of step S860 indicates that the physical contact state between the imaging device 10 and the imaging operation terminal 20 has changed from the contact state to the non-contact state, i.e., that the imaging device 10 and the imaging operation terminal 20 have changed from the combined state to the separated state ("Yes" in step S860), the process proceeds to step S840. Thereby, the operation mode selection section 24 performs a process of turning OFF the power of the imaging device 10 in steps S840 and S841 without changing the setting of the current operation mode (utilization mode) and ends the third operation mode change process.

Also, a method of transmitting the command for turning OFF the power of the imaging device 10 is not limited to a configuration in which the command is automatically transmitted as described above. For example, a configuration can be made to display a query of whether to actually turn OFF the power of the imaging device 10 on the display section 28 provided in the imaging operation terminal 20 and transmit the command for turning OFF the power of the imaging device 10 after the user has input an instruction for turning OFF the power of the imaging device 10 by operating the input section 30.

In addition, when the result of the check of step S860 indicates that the physical contact state between the imaging device 10 and the imaging operation terminal 20 has not changed from the contact state to the non-contact state, i.e., the imaging device 10 and the imaging operation terminal 20 have not changed from the combined state, or when the physical contact state has changed from the separated state to the combined state ("No" in step S860), the operation mode selection section 24 proceeds to step S870.

Subsequently, in step S870, the operation mode selection section 24 checks whether the physical contact state between the imaging device 10 and the imaging operation terminal 20 has changed from the non-contact state to the contact state, i.e., whether the physical contact state between the imaging device 10 and the imaging operation terminal 20 has changed from the separated state to the combined state. Then, when the result of the check of step S870 indicates that the physical contact state between the imaging device 10 and the imaging operation terminal 20 does not vary, i.e., that the imaging device 10 and the imaging operation terminal 20 have not changed from the separated state ("No" in step S870), the setting of the current operation mode (utilization mode) is maintained and the check of the end of the use of the imaging system 1 of steps S810 to S830, i.e., the check of the end of the utilization mode, is iterated by returning to step S800.

In addition, when the result of the check of step S870 indicates that the physical contact state between the imaging device 10 and the imaging operation terminal 20 has changed from the non-contact state to the contact state ("Yes" in step S870), the operation mode selection section 24 proceeds to step S880, cancels the setting of the current operation mode (utilization mode), and changes the operation mode to the shooting mode by referring to the operation table when the physical contact state has changed stored in the storage section 25. Thereby, the third operation mode change process is turned over to the first operation mode change process which is the operation mode change process during the above-described shooting mode.

Thereby, when the user uses the imaging system 1 in the utilization mode in the third operation mode change process, the variation of the physical contact state between the imaging device 10 and the imaging operation terminal 20 is checked sequentially or at cyclical intervals and the operation mode is automatically changed according to the variation of the physical contact state between the imaging device 10 and the imaging operation terminal 20. In addition, when the use of the imaging system 1 ends and when the physical contact state between the imaging device 10 and the imaging operation terminal 20 has changed from the combined state to the separated state, the power of the imaging device 10 is turned OFF. Thereby, the user can perform shooting using the imaging system 1 by combining the imaging device 10 with the imaging operation terminal 20 and end shooting using the imaging system 1 by separating the imaging device 10 from the imaging operation terminal 20. In this case, because the power of the imaging device 10 can be turned OFF, it is possible to prevent the imaging device 10 from consuming extra power, more comfortably use the imaging system 1, and reduce power consumption of the imaging system 1.

(Example of Operation Mode Change)

Figure 18A:
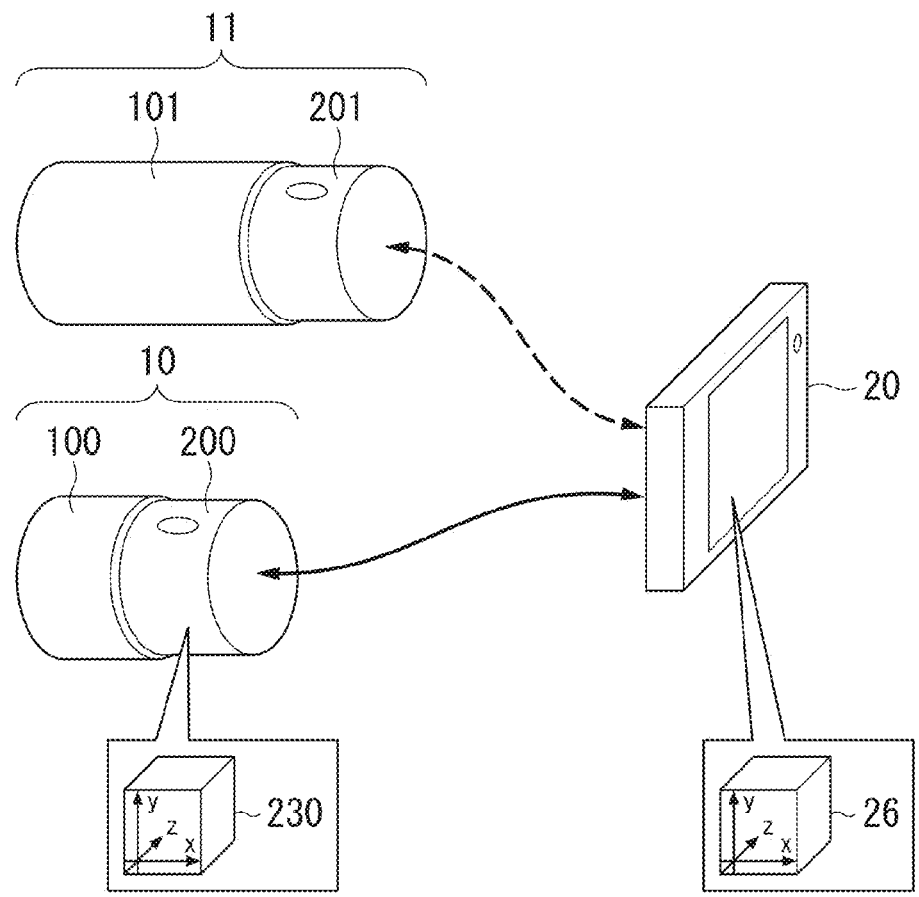
FIGS. 18A and 18B are diagrams each illustrating an example of a use form in which the physical contact state between the imaging device and the imaging operation terminal varies in the imaging system of this embodiment.
Figure 18B:
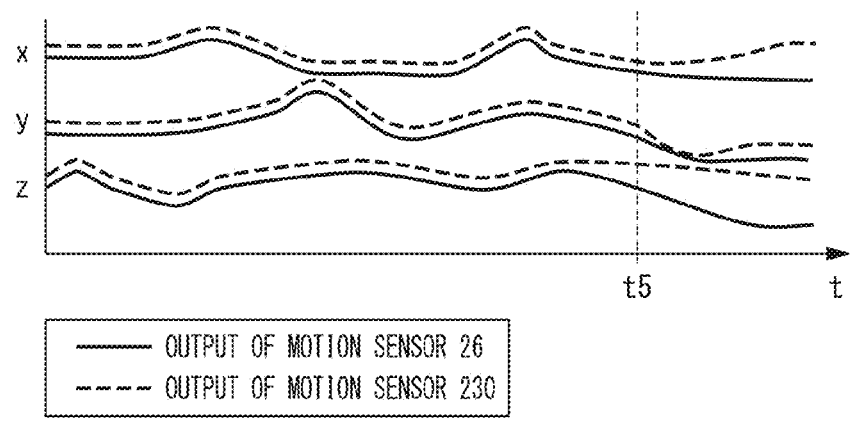

Here, an example in the operation mode change process when the physical contact state between the imaging device 10 and the imaging operation terminal 20 varies in a state in which the imaging system 1 is used will be described. FIGS. 18A and 18B are diagrams each illustrating an example of a use form in which the physical contact state between the imaging device 10 and the imaging operation terminal 20 varies in the imaging system 1 of this embodiment. The use form illustrated in each of FIGS. 18A and 18B is an example when the imaging device 10 which performs wireless communication with the imaging operation terminal 20 is replaced.

Moreover, because the imaging device 10 includes the optical module 100 and the imaging module 200 as described above, only the optical module 100 can be replaced. However, because the imaging module 200 which performs the wireless communication with the imaging operation terminal 20 is the same in the imaging system 1 when only the optical module 100 is replaced, the physical contact state between the imaging device 10 and the imaging operation terminal 20 may not vary. Accordingly, in the following description, the imaging device 10 itself which performs the wireless communication with the imaging operation terminal 20 will be described as being replaced.

More specifically, the replacement of the imaging device which performs the wireless communication with the imaging operation terminal 20 from the imaging device 10 including the optical module 100 and the imaging module 200 to an imaging device 11 including an optical module 101 and an imaging module 201 will be described. That is, the first operation mode change process illustrated in FIGS. 15A and 15B for changing the operation mode according to the variation of the physical contact state between the imaging device 10 and the imaging operation terminal 20 when the user uses the imaging system 1 in the shooting mode in the use form illustrated in each of FIGS. 18A and 18B will be described. However, the operation table when the physical contact state has changed stored in the storage section 25 will be described as being different from the settings illustrated in FIG. 15A, a setting for turning OFF the power of the imaging device 10 will be described as being performed as the operation mode (mode C illustrated in FIG. 14) without changing the operation mode when the state changes from the combined state to the separated state, and the operation mode (mode D illustrated in FIG. 14) when the state has changed from the separated state to the combined state will be described as being set without changing the operation mode.

Also, it is assumed that the fact that the imaging device 10 of the combination of the optical module 100 and the imaging module 200 and the imaging device 11 of the combination of the optical module 101 and the imaging module 201 are imaging devices capable of wireless communication with the imaging operation terminal 20 is registered in advance.

As described above, the physical state detection section 23 detects the variation of the physical contact state between the imaging device 10 and the imaging operation terminal 20 even after the imaging system 1 has started up. In the example illustrated in FIGS. 18A and 18B, as illustrated in FIG. 18A, the variation of the physical contact state between the imaging device 10 and the imaging operation terminal 20 is assumed to be detected using the motion sensor 230 provided in the imaging device 10 and the motion sensor 26 provided in the imaging operation terminal 20. At this time, when the imaging device 10 and the imaging operation terminal 20 are in the combined state, information about a motion amount of each direction of the imaging device 10 detected by the motion sensor 230 and information about a motion amount of each direction of the imaging operation terminal 20 detected by the motion sensor 26 vary to be the same as illustrated in FIG. 18B.

In this state, for example, at a time t5, the information about the motion amount of each direction of the imaging device 10 detected by the motion sensor 230 and the information about the motion amount of each direction of the imaging operation terminal 20 detected by the motion sensor 26 vary to be different as illustrated in FIG. 18B when the imaging device 10 and the imaging operation terminal 20 are separated to the separated state. Based on the variation of the information about the motion amount of each direction of the imaging device 10 detected by the motion sensor 230 and the information about the motion amount of each direction of the imaging operation terminal 20 detected by the motion sensor 26 after the time t5, the physical state detection section 23 detects that the physical contact state between the imaging device 10 and the imaging operation terminal 20 has changed from the contact state to the non-contact state. Then, the physical state detection section 23 outputs the information about the detected current physical contact state between the imaging device 10 and the imaging operation terminal 20 to the operation mode selection section 24 (see step S630).

Subsequently, the operation mode selection section 24 checks that the physical contact state between the imaging device 10 and the imaging operation terminal 20 has changed from the contact state to the non-contact state based on information of a current physical contact state input from the physical state detection section 23 (see step S640). Then, the operation mode selection section 24 turns OFF the power of the imaging device 10 and maintain the setting of the current operation mode (shooting mode) based on the operation table when the physical contact state has changed stored in the storage section 25.

Subsequently, the operation mode selection section 24 checks whether the use of the imaging system 1 ends (see step S650). Here, because the imaging device 10 is replaced with the imaging device 11, i.e., because the use of the imaging system 1 does not end, the operation mode selection section 24 iterates the check of the variation of the physical contact state between the imaging device 10 and the imaging operation terminal 20 (see "No" in step S650). Thereby, the imaging operation terminal 20 can maintain the setting of the shooting mode which is the current operation mode and turn OFF the power of the imaging device 10.

Thereafter, when the operation mode selection section 24 checks that the physical contact state between the imaging device 11 and the imaging operation terminal 20 has changed from the non-contact state to the contact state by the physical state detection section 23, the imaging device 11 and the imaging operation terminal 20 perform wireless communication and a shooting process in a current shooting mode using the imaging device 11.

Thereby, in the imaging system 1, it is possible to replace the imaging device which performs the wireless communication with the imaging operation terminal 20 from the imaging device 10 to the imaging device 11. In this case, in the imaging system 1, the operation mode is prevented from being changed every time even when the physical contact state between the imaging device 10 and the imaging operation terminal 20 has varied by keeping a setting in which the operation mode is not changed in the operation table when the physical contact state has changed. Thereby, the user can more comfortably use the imaging system 1.

Also, the imaging operation terminal 20 temporarily ends the setting of the shooting mode which is a current operation mode after transmitting a command for turning OFF the power to the imaging device 10 through wireless communication and the shooting mode may be set again by turning ON the power in a state in which the imaging device 11 is in a state of physical contact with the imaging operation terminal 20.

(Example of Use Form)

Figure 19:
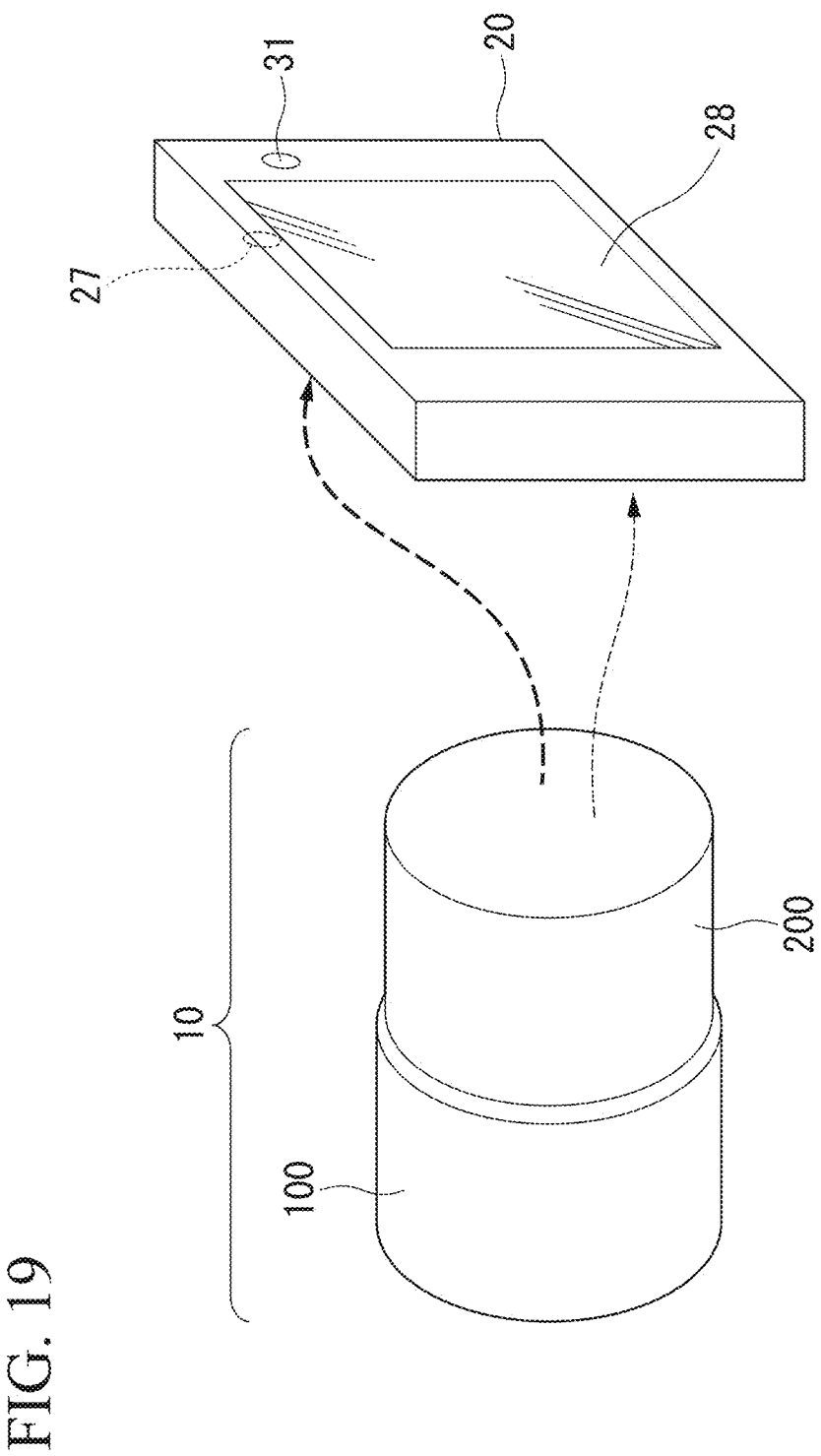
FIG. 19 is a diagram illustrating an example of a use form of the imaging system in this embodiment.

Next, the example of the use form of the imaging system 1 will be described. FIG. 19 is a diagram illustrating the example of the use form of the imaging system 1 in this embodiment. In the use form illustrated in FIG. 19, the case in which the imaging operation terminal 20 is a portable communication terminal in which application software configured to control the imaging device 10 is embedded is shown.

The imaging operation terminal 20 (portable communication terminal) includes a backside camera 27, a display section 28, and a front-side camera 31. In addition to basic shooting application software configured to control the imaging device 10, a plurality of pieces of other various shooting application software configured to control the imaging device 10 are embedded in the imaging operation terminal 20 (portable communication terminal). In the example of this use form of the imaging system 1, an example in which the imaging operation terminal 20 provided with the components as illustrated in FIG. 19 starts up corresponding shooting application software according to a position at which the imaging device 10 has been combined (a position at which the imaging device 10 physically contacts the imaging operation terminal 20) will be described.

FIG. 20 is a block diagram illustrating a schematic configuration in the example of the use form of the imaging system 1 of this embodiment. In FIG. 20, the backside camera 27, the display section 28, the front-side camera 31, and an application selection section 32 are illustrated in addition to the block diagram of the imaging system 1 illustrated in FIG. 2. In the following description, detailed description of the components having the same functions and operations as those of the imaging system 1 illustrated in FIG. 2 among the components illustrated in FIG. 20 is omitted.

The physical state detection section 23 detects the physical contact state between the imaging device 10 and the imaging operation terminal 20, and outputs information about the detected physical contact state between the imaging device 10 and the imaging operation terminal 20 to the operation mode selection section 24. In addition, the physical state detection section 23 determines a position at which the imaging device 10 has been combined with the imaging operation terminal 20 and outputs information about the determined position at which the imaging device 10 has been combined with the imaging operation terminal 20 to the application selection section 32.

The storage section 25 stores various application software capable of being started up according to a position at which the imaging device 10 has been combined in addition to the settings corresponding to the operation modes of the imaging system 1 or the operation mode information of the start-up mode table and the operation table when the physical contact state has changed described above, etc.

According to the physical contact state between the imaging device 10 and the imaging operation terminal 20 detected by the physical state detection section 23, the operation mode selection section 24 refers to the settings corresponding to the operation modes stored in the storage section 25 or the operation mode information of the start-up mode table and the operation table when the physical contact state has changed described above, etc. and selects the operation mode to be executed by the imaging operation terminal 20. Then, the operation mode selection section 24 outputs information about the selected operation mode to the application selection section 32.

The application selection section 32 selects the application software to be executed by the imaging operation terminal 20 from among the application software stored in the storage section 25 according to information about the operation mode selected by the operation mode selection section 24 and information about a position at which the imaging device 10 has been combined with the imaging operation terminal 20 detected by the physical state detection section 23. That is, in the imaging system 1, a function to be provided to the user is selected. Thus, the application selection section 32 starts up the selected application software.

The backside camera 27 is a camera provided on a side with which the imaging device 10 is in physical contact in the imaging operation terminal 20, and photographs the back of the imaging operation terminal 20.

The front-side camera 31 is a camera provided on a side from which information is displayed in the imaging operation terminal 20, i.e., a side viewed by the user, and photographs the front of the imaging operation terminal 20.

The display section 28 provides information to the user by displaying an image captured by the imaging device 10, an image captured by the backside camera 27, an image captured by the front-side camera 31, an image of application software, information about the imaging operation terminal 20, or the like.

Here, the position at which the imaging device 10 has been combined with the imaging operation terminal 20, i.e., the position at which the imaging device 10 has physically contacted the imaging operation terminal 20, and the application software to start up will be described. FIGS. 21A to 21F are diagrams each illustrating a method of determining the physical contact position between the imaging device 10 and the imaging operation terminal 20 in the example of the use form of the imaging system 1 of this embodiment. As illustrated in FIGS. 21A to 21F, the physical state detection section 23 determines the physical contact position between the imaging device 10 and the imaging operation terminal 20 based on the image captured by the backside camera 27 in a state in which the imaging device 10 has been physically contacted.

Figure 21A:
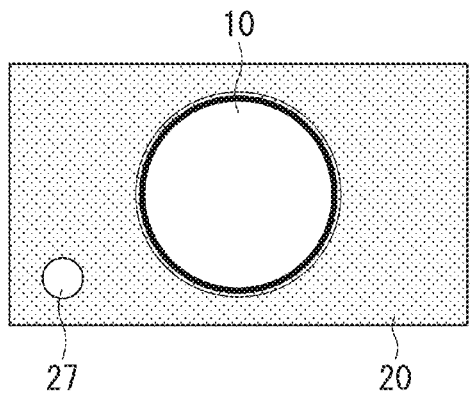
FIGS. 21A to 21F are diagrams each illustrating a method of determining the physical contact position between the imaging device and the imaging operation terminal in the example of the use form of the imaging system of this embodiment.
Figure 21B:
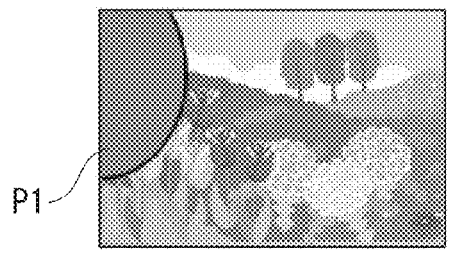
Figure 21C:
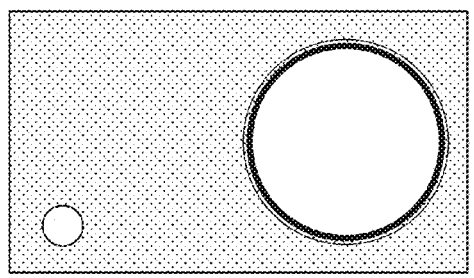

More specifically, when the imaging device 10 is physically contacted at a position around the center of the imaging operation terminal 20 as illustrated in FIG. 21A, a range of a region P in which the imaging device 10 appears within the image captured by the backside camera 27 becomes a range such as a region P1 illustrated in FIG. 21B. When the imaging device 10 is physically contacted at a position shifted in the opposite direction from a position at which the backside camera 27 of the imaging operation terminal 20, i.e., physically contacted at a position away from the backside camera 27, as illustrated in FIG. 21C, the range of the region P in which the imaging device 10 appears within the image captured by the backside camera 27 becomes a range less than the region P1 such as a region P2 illustrated in FIG. 21D. In addition, when the imaging device 10 is physically contacted at a position shifted in the same direction as a position at which the backside camera 27 of the imaging operation terminal 20, i.e., physically contacted at a position close to the backside camera 27, as illustrated in FIG. 21E, the range of the region P in which the imaging device 10 appears within the image captured by the backside camera 27 becomes a range greater than the region P1 such as a region P3 illustrated in FIG. 21F.

In the imaging system 1, the physical state detection section 23 determines the physical contact position between the imaging device 10 and the imaging operation terminal 20 using the fact that a size (area) of the range of the region P in which the imaging device 10 appears within the image captured by the backside camera 27 differs according to a position at which the imaging device 10 physically contacts the imaging operation terminal 20.

Figure 21D:
Figure 21E:
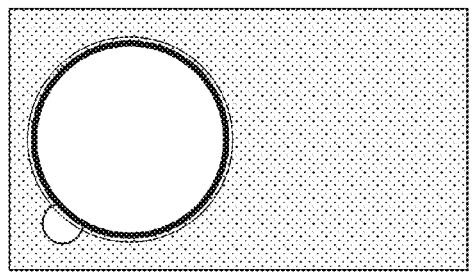
Figure 21F:
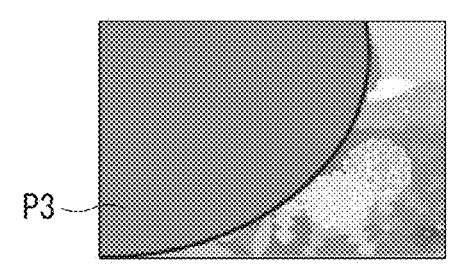

In each of FIGS. 21B, 21D, and 21F, an example of an image captured by the backside camera 27 displayed on the display section 28 is illustrated. However, when the physical state detection section 23 determines the position at which the imaging device 10 physically contacts the imaging operation terminal 20, it is only necessary, for example, to perform a process of checking the region P in which the imaging device 10 appears within the image captured by the backside camera 27 through image recognition without the need to cause the display section 28 to display the image captured by the backside camera 27. Here, the image recognition in which the physical state detection section 23 checks the region P and the area of the region P, for example, can be performed in a process of detecting a predetermined shape of the imaging device 10 or a process of detecting a region in which a subject does not move within an image when the backside camera 27 captures a moving image.

Thus, in the imaging system 1, the application selection section 32 selects application software to start up according to information about the position at which the imaging device 10 is combined with the imaging operation terminal 20 determined by the physical state detection section 23. For example, when the imaging device 10 physically contacts at the position around the center of the imaging operation terminal 20 as illustrated in FIG. 21A, it is possible to automatically start up application software of the shooting mode in which typical shooting function is performed according to the physical contact position between the imaging device 10 and the imaging operation terminal 20 detected by the physical state detection section 23. In addition, for example, when the imaging device 10 is physically contacted at a position away from the backside camera 27 of the imaging operation terminal 20 as illustrated in FIG. 21C, it is possible to automatically start up application software of the shooting mode in which the backside camera 27 provided in the imaging operation terminal 20 and the imaging device 10 are simultaneously used. In addition, for example, when the imaging device 10 is physically contacted at a position close to the backside camera 27 of the imaging operation terminal 20 as illustrated in FIG. 21E, it is possible to automatically start up application software of the shooting mode in which the front-side camera 31 provided in the imaging operation terminal 20 and the imaging device 10 are simultaneously used.

Although an example in which the backside camera 27 is arranged at a lower left position of the imaging operation terminal 20 in each of FIGS. 21A to 21F has been described, the position at which the backside camera 27 is arranged may differ according to each portable communication terminal. However, the position at which the backside camera 27 is arranged is known in advance in each portable communication terminal. Thus, a relationship between the position at which the backside camera 27 is arranged and the position at which the imaging device 10 is physically contacted is considered to be easily discriminable based on the position of the region P in which the imaging device 10 appears within the image captured by the backside camera 27 or the area of the region P. Accordingly, even when the position at which the backside camera 27 is arranged differs according to each portable communication terminal, the physical state detection section 23 can select application software according to the area of the region P within the image captured by the backside camera 27 and automatically start up the selected application software.

In the imaging system 1, the imaging device 10 and the imaging operation terminal 20 are determined to be in the combined state according to any one of the above-described first to third physical contact state detection methods, and, after the shooting mode has been set by the method of any one of the above-described first to third start-up processes or the user, a process of determining the physical contact position between the imaging device 10 and the imaging operation terminal 20 (hereinafter referred to as a "determination process of a contact position") starts.

Figure 22:
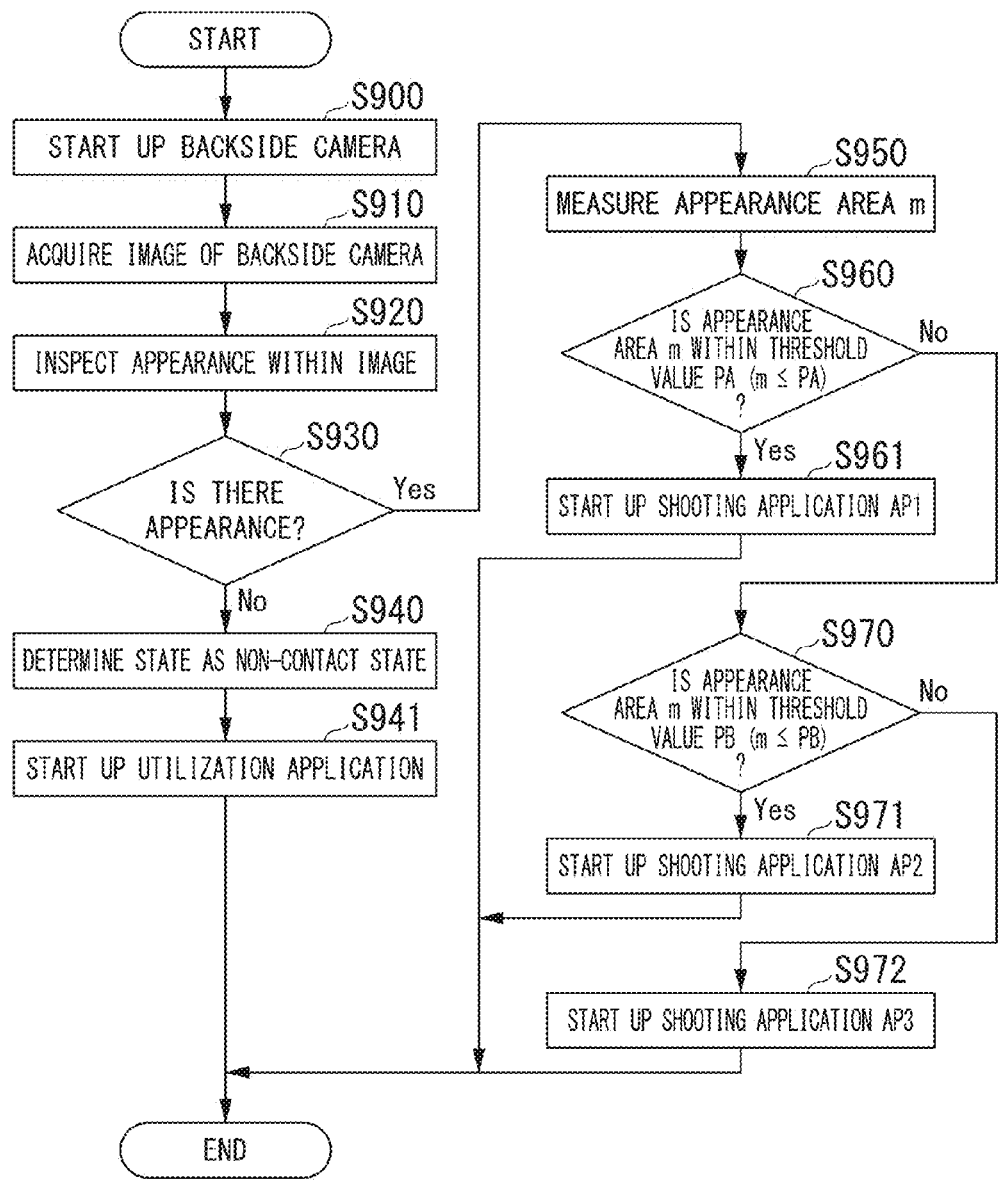
FIG. 22 is a flowchart illustrating a processing procedure of determining the physical contact position between the imaging device and the imaging operation terminal in the example of the use form of the imaging system of this embodiment.

Here, a method of selecting the application software to start up according to the position at which the imaging device 10 has been combined with the imaging operation terminal 20 in the imaging system 1 will be described. FIG. 22 is a flowchart illustrating a processing procedure of determining the physical contact position between the imaging device 10 and the imaging operation terminal 20 in the example of the use form of the imaging system 1 of this embodiment. Also, in the flowchart of the determination process of the contact position illustrated in FIG. 22, the processing procedure in which the physical state detection section 23 performs the determination process of the contact position between the imaging device 10 and the imaging operation terminal 20, and then the application selection section 32 selects application software to start up is illustrated.

In the determination process of the contact position illustrated in FIG. 22, the area of the region P1 of the imaging device 10 considered to appear within the image captured by the backside camera 27 (see FIG. 21B) is caused to have a predetermined range when the imaging device 10 is physically contacted at a position around the center of the imaging operation terminal 20 (see FIG. 21A). Thus, it is assumed that the application software to start up is selected by setting a minimum value of the area of the region P1 as a threshold value PA, setting a maximum value of the area of the region P1 as a threshold value PB, and determining whether a position at which the imaging device 10 physically contacts the imaging operation terminal 20 is inside or outside a predetermined range around the center of the imaging operation terminal 20.

When the determination process of the contact position starts, the physical state detection section 23 first starts up the backside camera 27 in step S900. Subsequently, in step S910, the physical state detection section 23 acquires an image captured by the backside camera 27.

Subsequently, in step S920, the physical state detection section 23 inspects a region P of the imaging device 10 appearing in the acquired image. Subsequently, in step S930, the physical state detection section 23 determines whether there is an appearance of the imaging device 10 within the acquired image, i.e., whether there is a region P in which the imaging device 10 appears. Then, when the result of the determination of step S930 indicates that there is no appearance of the imaging device 10 within the image ("No" in step S930), the imaging device 10 and the imaging operation terminal 20 are determined to be physically in the non-contact state (for example, the separated state) as the result of the determination process of the contact position in step S940. Then, the physical state detection section 23 outputs information representing that the imaging device 10 and the imaging operation terminal 20 are in the separated state to the operation mode selection section 24.

Thereafter, in step S941, the operation mode selection section 24 selects the utilization mode as the operation mode to be executed by the imaging operation terminal 20 according to information representing that the imaging device 10 and the imaging operation terminal 20 are in the separated state input from the physical state detection section 23, and outputs information representing that the utilization mode has been selected to the application selection section 32. Then, the application selection section 32 selects application software (a utilization application) according to the utilization mode stored in the storage section 25 according to information representing that the utilization mode has been selected input from the operation mode selection section 24. Then, the determination process of the contact position ends by starting up the selected utilization application.

In addition, when the result of the determination of step S930 indicates that there is an appearance of the imaging device 10 within the image ("Yes" in step S930), the imaging device 10 and the imaging operation terminal 20 are determined to be physically in the contact state (for example, the combined state) as the result of the determination process of the contact position in step S950. Then, the physical state detection section 23 outputs information representing that the imaging device 10 and the imaging operation terminal 20 are in the combined state to the operation mode selection section 24. Thereby, the operation mode selection section 24 selects the shooting mode as the operation mode to be executed by the imaging operation terminal 20 according to information representing that the imaging device 10 and the imaging operation terminal 20 are in the combined state input from the physical state detection section 23, and outputs information representing that the shooting mode has been selected to the application selection section 32.

In addition, in step S950, the physical state detection section 23 measures an appearance area m of the region P in which the imaging device 10 appears.

Subsequently, in step S960, the physical state detection section 23 determines whether the measured appearance area m is within the predetermined threshold value PA of the area of the region P. Then, when the result of the determination of step S960 indicates that the appearance area m is within the predetermined threshold value PA of the area of the area P, i.e., when m≤PA ("Yes" in step S960), the physical state detection section 23 outputs information representing that the appearance area m is within the threshold value PA to the application selection section 32.

Thereafter, in step S961, the application selection section 32 selects application software (a shooting application AP1) according to when the area (appearance area m) of the region P is within the threshold value PA in the shooting mode stored in the storage section 25 according to information representing that the shooting mode has been selected input from the operation mode selection section 24 and information representing that the appearance area m is within the threshold value PA input from the physical state detection section 23. Then, the determination process of the contact position ends by starting up the selected shooting application AP1.

Also, the determination result of "Yes" in step S960 indicates that the imaging device 10 is determined to be physically contacted at a position away from the backside camera 27 of the imaging operation terminal 20 as illustrated in FIGS. 21C and 21D. Then, the shooting application AP1, for example, corresponds to the above-described application software of the shooting mode in which the backside camera 27 provided in the imaging operation terminal 20 and the imaging device 10 are simultaneously used.

In addition, when the result of the determination of step S960 indicates that the appearance area m is not within the predetermined threshold value PA of the region P, i.e., when m>PA ("No" in step S960), the physical state detection section 23 proceeds to step S970 and determines whether the measured appearance area m is within the threshold value PB (PA<PB) of the area of the region P greater than the predetermined threshold value PA of the area of the region P. Then, when the result of the determination of step S970 indicates that the appearance area m is within the predetermined threshold value PB of the area of the region P, that is when m PB ("Yes" in step S970), the physical state detection section 23 outputs information representing that the appearance area m is within the threshold value PB to the application selection section 32.

Thereafter, in step S971, the application selection section 32 selects application software (a shooting application AP2) according to when the area (appearance area m) of the region P is greater than the threshold value PA and within the threshold value PB in the shooting mode stored in the storage section 25 according to information representing that the shooting mode has been selected input from the operation mode selection section 24 and information representing that the appearance area m is within the threshold value PB input from the physical state detection section 23. Then, the determination process of the contact position ends by starting up the selected shooting application AP2.

Also, the determination result of "Yes" in step S970 indicates that the imaging device 10 is determined to be physically contacted at a position around the center of the imaging operation terminal 20 as illustrated in FIGS. 21A and 21B. Then, the shooting application AP2, for example, corresponds to the above-described application software of the shooting mode in which typical shooting function is performed according to the physical contact state between the imaging device 10 and the imaging operation terminal 20 detected by the physical state detection section 23.

In addition, when the result of the determination of step S970 indicates that the appearance area m is not within the predetermined threshold value PB of the region P, i.e., when m>PB ("No" in step S970), the physical state detection section 23 outputs information representing that the appearance area m is not within the threshold value PB to the application selection section 32.

Thereafter, in step S972, the application selection section 32 selects application software (a shooting application AP3) according to when the area (appearance area m) of the region P is greater than the threshold value PB in the shooting mode stored in the storage section 25 according to information representing that the shooting mode has been selected input from the operation mode selection section 24 and information representing that the appearance area m is not within the threshold value PB input from the physical state detection section 23. Then, the determination process of the contact position ends by starting up the selected shooting application AP3.

Also, the determination result of "No" in step S970 indicates that the imaging device 10 is determined to be physically contacted at a position close to the backside camera 27 of the imaging operation terminal 20 as illustrated in FIGS. 21E and 21F. Then, the shooting application AP3, for example, corresponds to the above-described application software of the shooting mode in which the front-side camera 31 provided in the imaging operation terminal 20 and the imaging device 10 are simultaneously used.

Thereby, in the determination process of the contact position, the physical contact position between the imaging device 10 and the imaging operation terminal 20 is determined using an image captured by the backside camera 27 provided on a side that the imaging device 10 physically contacts in the imaging operation terminal 20. Then, application software is selected according to the determined physical contact position between the imaging device 10 and the imaging operation terminal 20 and the selected application software starts up. Thereby, the imaging operation terminal 20 can automatically start up a function of the imaging system 1 considered to be used by the user in the imaging system 1 and the user can more comfortably use the imaging system 1.

Also, the determination process of the contact position is not limited to the above-described method of determining the position at which the imaging device 10 has been combined with the imaging operation terminal 20 based on the area of the region P1 of the imaging device 10 appearing within the image captured by the backside camera 27. For example, it is possible to determine the position at which the imaging device 10 has been combined with the imaging operation terminal 20 based on a distance between the position of the imaging device 10 and the backside camera 27. In this case, application software is selected based on a predetermined threshold value of the distance between the position of the imaging device 10 and the backside camera 27.

As described above, according to a form for carrying out the present invention, a physical contact state between an imaging device including an optical module having an optical system such as a lens and an imaging module having an imaging element and an imaging operation terminal configured to control an operation of the imaging device is detected without use of an electrical contact point. Thus, in the form for carrying out the present invention, an operation mode to be initially used when the imaging system starts up is preset for each physical contact state between the imaging device and the imaging operation terminal. Thereby, in the form for carrying out the present invention, in the imaging system in which the imaging device and the imaging operation terminal perform wireless communication, it is possible to automatically switch the initial operation mode when the imaging system starts up according to the detected physical contact state between the imaging device and the imaging operation terminal. Thereby, in the form for carrying out the present invention, it is possible to automatically start up software according to the operation mode after the switching.

In addition, according to a form for carrying out the present invention, the operation mode to which switching is directed when the physical contact state between the imaging device and the imaging operation terminal has varied when the imaging system is used is preset for each state in which the physical contact state between the imaging device and the imaging operation terminal varies. Thereby, in the form for carrying out the present invention, in the imaging system in which the imaging device and the imaging operation terminal perform wireless communication, it is possible to automatically switch the operation mode of the imaging system according to the variation of the physical contact state between the imaging device and the imaging operation terminal when the imaging system is used. Thereby, in the form for carrying out the present invention, it is possible to automatically start up software according to the operation mode after the switching.

In addition, according to a form for carrying out the present invention, it is possible to detect the physical contact state between the imaging device and the imaging operation terminal using components already provided in the imaging device and the imaging operation terminal. Thereby, in the form for carrying out the present invention, it is possible to detect the physical contact state between the imaging device and the imaging operation terminal at a low cost.

In addition, according to a form for carrying out the present invention, it is possible to automatically turn OFF power of the unused imaging device as a result of detection of the physical contact state between the imaging device and the imaging operation terminal. Thereby, in the form for carrying out the present invention, it is possible to suppress extra power consumption of the imaging device and reduce power consumption of the overall imaging system.

Also, the configuration in which the operation mode selection section 24 selects the operation mode to be executed by the imaging operation terminal 20 and the application selection section 32 selects and starts up application software to be executed by the imaging operation terminal 20 in this embodiment has been described. However, the configuration in which the selection of the operation mode and the selection and start-up of the application software to perform is not limited to the form for carrying out the present invention. For example, the application selection section 32 can also be configured to select the operation mode instead of the operation mode selection section 24. That is, the application selection section 32 can also be configured to select the operation mode and select and start up the application software. In this case, the operation mode selection section 24 is not provided in the imaging operation terminal 20, and the physical state detection section 23 performs the detection of the physical contact state between the imaging device 10 and the imaging operation terminal 20 and the determination of the physical contact position and outputs information about the physical contact state between the imaging device 10 and the imaging operation terminal 20 and information about a combined position to the application selection section 32.

In addition, the case in which the physical state detection section 23 performs the detection process of the physical contact state between the imaging device 10 and the imaging operation terminal 20 according to any one of the first to third physical contact state detection methods and further performs the determination process of the contact position between the imaging device 10 and the imaging operation terminal 20 using the backside camera 27 has been described in this embodiment. That is, the case in which the detection process of the physical contact state and the determination process of the contact position are separately performed has been described. However, when the detection process of the physical contact state is performed by the second physical contact state detection method, the physical state detection section 23 can simultaneously perform the detection process of the physical contact state and the determination process of the contact position.

Also, although the wireless communication detection section 22, the physical state detection section 23, the operation mode selection section 24, and the application selection section 32, which are components of the imaging system 1, have been described as including hardware in this embodiment, means for implementing functions of the wireless communication detection section 22, the physical state detection section 23, the operation mode selection section 24, and the application selection section 32 are not limited to the form for carrying out the present invention. For example, the function of the physical state detection section 23 can be implemented by software according to a computer program or the like. In this case, the physical state detection section 23 may be implemented by elements including CPU and memory of the computer, in term of hardware.

In this case, the above-described various processes according to the wireless communication detection section 22, the physical state detection section 23, the operation mode selection section 24, and the application selection section 32 or the imaging system 1 may be performed by recording a program for implementing the wireless communication detection section 22, the physical state detection section 23, the operation mode selection section 24, and the application selection section 32 or the imaging system 1 on a computer-readable recording medium (recording device) to cause the computer system to read and execute the program recorded on the recording medium. The computer system used here may include an operating system (OS) and hardware such as peripheral devices. In addition, the computer system may include a homepage providing environment (or displaying environment) when a World Wide Web (WWW) system is used. The computer-readable recording medium refers to a storage device, including a flexible disk, a magneto-optical disc, a read only memory (ROM), a writable nonvolatile memory such as a flash memory, a portable medium such as a compact disc (CD)-ROM, and a hard disk embedded in the computer system.

Furthermore, the "computer-readable recording medium" is assumed to be a medium that holds a program for a constant period of time, such as a volatile memory (e.g., a dynamic random access memory (DRAM)) inside a computer system serving as a server or a client when the program is transmitted via a network such as the Internet or a communication line such as a telephone line. In addition, the above-described program may be transmitted from a computer system storing the program in a storage device or the like via a transmission medium or transmitted to another computer system by transmission waves in a transmission medium. Here, the "transmission medium" refers to a medium having a function of transmitting information, such as a network (communication network) like the Internet or a communication circuit (communication line) like a telephone line. In addition, the above-described program may be a program for implementing some of the above-described processes. Further, the above-described program may be a program, i.e., a so-called differential file (differential program), capable of implementing the above-described processes in combination with a program already recorded on a computer system.

Also, although a type of wireless communication to be performed between the imaging device 10 and the imaging operation terminal 20 has not been described in this embodiment, the type of wireless communication is not limited to communication by radio waves. For example, an idea of the present invention can be applied to any type of communication of a communication method without using an electrical contact point such as optical communication or voice communication.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An imaging operation terminal comprising:
   a storage section configured to store switching information of an operation mode which operates according to a state of physical contact with an imaging device;
   a communication section configured to perform wireless communication with the imaging device;
   a communication detection section configured to detect whether the wireless communication by the communication section with the imaging device is possible;
   a physical state detection section configured to detect the state of the physical contact with the imaging device; and
   an operation mode selection section configured to select one operation mode based on the switching information according to the state of the physical contact with the imaging device detected by the physical state detection section after the communication detection section has detected that the wireless communication with the imaging device is possible,
   wherein the operation mode includes a shooting mode for performing shooting by using the imaging device and a utilization mode for utilizing an image obtained by the shooting by the imaging device, the shooting mode and the utilization mode being mutually exclusive, and
   wherein the operation mode selection section selects one of the shooting mode and the utilization mode.

2. The imaging operation terminal according to claim 1, further comprising:
   an input section configured to receive an instruction to cancel the operation mode selected by the operation mode selection section and provide a notification of the received cancel instruction,
   wherein the operation mode selection section selects one operation mode different from the selected operation mode when the notification of the cancel instruction has been received from the input section.

3. The imaging operation terminal according to claim 1, wherein the operation mode selection section selects the shooting operation mode for enabling the imaging device to perform shooting when the physical state detection section has detected a contact state in which the imaging device has made the physical contact.

4. The imaging operation terminal according to claim 3, wherein the operation mode selection section selects the utilization operation mode for utilizing an image captured by the imaging device when the physical state detection section has detected a non-contact state in which the imaging device has not made the physical contact.

5. The imaging operation terminal according to claim 1, wherein the operation mode selection section selects the utilization operation mode for utilizing an image captured by the imaging device when the physical state detection section has detected a non-contact state in which the imaging device has not made the physical contact.

6. The imaging operation terminal according to claim 1, wherein the physical state detection section detects variation of a state of the physical contact with the imaging device, and
wherein the operation mode selection section reselects one operation mode according to the state of the physical contact with the imaging device after the variation when the state of the physical contact with the image device detected by the physical state detection section has varied.

7. The imaging operation terminal according to claim 6, wherein the operation mode selection section cancels the selection of the operation mode before the state of the physical contact with the imaging device varies.

8. The imaging operation terminal according to claim 6, wherein the operation mode selection section disconnects wireless communication by the communication section with the imaging device when the state of the physical contact with the imaging device has varied to a non-contact state.

9. The imaging operation terminal according to claim 1, wherein the storage section further stores a plurality of pieces of application software to be executed according to the state of the physical contact with the imaging device, and
wherein the imaging operation terminal comprises:
an application selection section configured to select one piece of the application software corresponding to the operation mode selected by the operation mode selection section from among the plurality of pieces of the application software stored in the storage section and start up the selected application software; and
a display section configured to display an image by the application software started up by the application selection section.

10. The imaging operation terminal according to claim 9, wherein the physical state detection section further detects a position at which the imaging device makes the physical contact, and
wherein the application selection section selects the application software according to the position at which the imaging device makes the physical contact detected by the physical state detection section.

11. The imaging operation terminal according to claim 10, further comprising:
a first imaging section arranged on a side with which the imaging device makes the physical contact in the imaging operation terminal and configured to photograph a direction similar to a direction in which shooting is performed by the imaging device,
wherein the physical state detection section detects a position at which the imaging device makes the physical contact based on an image captured by the first imaging section.

12. The imaging operation terminal according to claim 11, wherein the application selection section selects the application software for performing shooting simultaneously using the imaging device and the first imaging section when the physical state detection section has detected that the position at which the imaging device makes the physical contact is a position opposite a position at which the first imaging section is arranged outside a predetermined range based on the position at which the first imaging section is arranged.

13. The imaging operation terminal according to claim 11, further comprising:
a second imaging section arranged on a side with which the imaging device does not make the physical contact in the imaging operation terminal and configured to photograph a direction different from a direction in which shooting is performed by the first imaging section,
wherein the application selection section selects the application software for performing shooting simultaneously using the imaging device and the second imaging section when the physical state detection section has detected that the position at which the imaging device makes the physical contact is the same side position as a position at which the first imaging section is arranged outside a predetermined range based on the position at which the first imaging section is arranged.

14. The imaging operation terminal according to claim 11, wherein the application selection section selects the application software for performing shooting using only the imaging device among the imaging device and the first imaging section when the physical state detection section has detected that the position at which the imaging device makes the physical contact is a position within a predetermined range based on the position at which the first imaging section is arranged.

15. The imaging operation terminal according to claim 1, wherein the physical state detection section detects the state of the physical contact with the imaging device during a predetermined detection period after the communication detection section has detected that wireless communication with the imaging device is possible.

16. The imaging operation terminal according to claim 1, wherein the physical state detection section detects the state of the physical contact with the imaging device after the communication detection section detects that wireless communication with the imaging device is possible and a predetermined time has elapsed.

17. The imaging operation terminal according to claim 1, further comprising:
a motion detection section configured to detect a motion amount for each direction of the imaging operation terminal,
wherein the communication section receives information about the motion amount for each direction of the imaging device from the imaging device, and
wherein the physical state detection section detects the state of the physical contact with the imaging device based on the information about the motion amount of the imaging operation terminal detected by the motion detection section and the information about the motion amount of the imaging device received by the communication section.

18. The imaging operation terminal according to claim 1, further comprising:
an imaging section arranged on a side with which the imaging device makes the physical contact in the imaging operation terminal and configured to photograph a direction similar to a direction in which shooting is performed by the imaging device, wherein the physical state detection section detects the state of the physical contact with the imaging device based on a region in which the imaging device included in an image captured by the imaging section appears.

19. The imaging operation terminal according to claim 1, further comprising:
a proximity wireless communication section configured to perform proximity wireless communication with the imaging device,
wherein the physical state detection section detects the state of the physical contact with the imaging device based on a state of the proximity wireless communication to be performed by the proximity wireless communication section with the imaging device.

20. A shooting system comprising:
an imaging device including an imaging element configured to photoelectrically convert an optical image of a subject incident via a lens and configured to transmit an image according to a pixel signal output from the imaging element through wireless communication; and
an imaging operation terminal including a storage section configured to store switching information of an operation mode which operates according to a state of physical contact with the imaging device; a communication section configured to perform wireless communication with the imaging device;
a communication detection section configured to detect whether the wireless communication by the communication section with the imaging device is possible;
a physical state detection section configured to detect the state of the physical contact with the imaging device; and an operation mode selection section configured to select one operation mode based on the switching information according to the state of the physical contact with the imaging device detected by the physical state detection section after the communication detection section has detected that the wireless communication with the imaging device is possible, and configured to receive the image transmitted from the imaging device and control shooting by the imaging device through wireless communication,
wherein the operation mode includes a shooting mode for performing shooting by using the imaging device and a utilization mode for utilizing an image obtained by the shooting by the imaging device, the shooting mode and the utilization mode being mutually exclusive, and
wherein the operation mode selection section selects one of the shooting mode and the utilization mode.

21. An imaging operation method comprising:
a communication step of performing wireless communication by an imaging operation terminal with an imaging device;
a communication detection step of detecting, by the imaging operation terminal, whether the wireless communication with the imaging device is possible in the communication step;
a physical state detection step of detecting, by the imaging operation terminal, a state of physical contact with the imaging device; and
an operation mode selection step of selecting, by the imaging operation terminal, one operation mode based on switching information of an operation mode which operates according to the state of physical contact with the imaging device stored in a storage section according to the state of the physical contact with the imaging device detected in the physical state detection step after it has been detected that wireless communication with the imaging device is possible in the communication detection step,
wherein the operation mode includes a shooting mode for performing shooting by using the imaging device and a utilization mode for utilizing an image obtained by the shooting by the imaging device, the shooting mode and the utilization mode being mutually exclusive, and
wherein the operation mode selection section selects one of the shooting mode and the utilization mode.

22. A non-transitory computer readable storage device storing a program for causing a computer of an imaging operation terminal to execute a method including:
a communication step of performing wireless communication with an imaging device;
a communication detection step of detecting whether the wireless communication with the imaging device is possible in the communication step;
a physical state detection step of detecting a state of physical contact with the imaging device; and
an operation mode selection step of selecting one operation mode based on switching information of an operation mode which operates according to the state of physical contact with the imaging device stored in a storage section according to the state of the physical contact with the imaging device detected in the physical state detection step after it has been detected that wireless communication with the imaging device is possible in the communication detection step,
wherein the operation mode includes a shooting mode for performing shooting by using the imaging device and a utilization mode for utilizing an image obtained by the shooting by the imaging device, the shooting mode and the utilization mode being mutually exclusive, and
wherein the operation mode selection section selects one of the shooting mode and the utilization mode.

\* \* \* \* \*